US012810259B2

(12) United States Patent
Eirinberg et al.

(10) Patent No.: US 12,810,259 B2
(45) Date of Patent: Nov. 24, 2026

(54) ADDING GRAPHICAL REPRESENTATION OF REAL-WORLD OBJECT

(71) Applicant: Snap Inc., Santa Monica, CA (US)

(72) Inventors: Dylan Shane Eirinberg, Venice, CA (US); Daniel Trinh, Paris (FR); Daniel Rakhamimov, Brooklyn, NY (US)

(73) Assignee: Snap Inc., Santa Monica, CA (US)

( * ) Notice: Subject to any disclaimer, the term of this patent is extended or adjusted under 35 U.S.C. 154(b) by 63 days.

(21) Appl. No.: 18/810,966

(22) Filed: Aug. 21, 2024

(65) Prior Publication Data

US 2024/0412423 A1 Dec. 12, 2024

Related U.S. Application Data

(63) Continuation of application No. 17/456,754, filed on Nov. 29, 2021, now Pat. No. 12,100,065.

(Continued)

(51) Int. Cl.
*G06Q 10/40* (2026.01)
*G06Q 30/0601* (2023.01)
(Continued)

(52) U.S. Cl.
CPC ......... *G06Q 10/40* (2026.01); *G06Q 30/0623* (2013.01); *G06Q 30/0643* (2013.01);
(Continued)

(58) Field of Classification Search
CPC ............... G06Q 10/40; G06Q 30/0623; G06Q 30/0631; G06Q 30/0643; G06V 10/751; G06V 20/20; G06T 11/00
(Continued)

(56) References Cited

U.S. PATENT DOCUMENTS

| | | | |
|---|---|---|---|
| 666,223 | A | 1/1901 | Shedlock |
| 4,581,634 | A | 4/1986 | Williams |

(Continued)

FOREIGN PATENT DOCUMENTS

| | | | |
|---|---|---|---|
| CA | 2887596 | A1 | 7/2015 |
| CN | 118176498 | A | 6/2024 |

(Continued)

OTHER PUBLICATIONS

Wen-ying Zhang, Guo-ming Q. A new framework of a personalized location-based restaurant recommendation system in mobile application. In2013 International Conference on Management Science and Engineering 20th Annual Conference Proceedings Jul. 17, 2013 (pp. 166-172). IEEE.*

(Continued)

*Primary Examiner* — Phu K Nguyen
(74) *Attorney, Agent, or Firm* — Schwegman Lundberg & Woessner, P.A.

(57) ABSTRACT

Methods and systems are disclosed for modifying an image. For example, a messaging application implemented on a client device displays an image comprising a real-world object and determines a current location of the client device. The messaging application identifies a venue associated with the current location of the client device and obtains a list of items available for purchase at the venue. The messaging application receives input that selects a given item from the list of items that corresponds to the real-world object. The messaging application adds, to the image, a graphical representation of the given item that corresponds to the real-world object depicted in the image.

20 Claims, 11 Drawing Sheets

Related U.S. Application Data

(60) Provisional application No. 63/273,341, filed on Oct. 29, 2021.

(51) Int. Cl.
*G06T 11/00* (2026.01)
*G06V 10/75* (2022.01)
*G06V 20/20* (2022.01)

(52) U.S. Cl.
CPC ............ *G06T 11/00* (2013.01); *G06V 10/751* (2022.01); *G06V 20/20* (2022.01)

(58) Field of Classification Search
USPC .......................................................... 345/418
See application file for complete search history.

(56) References Cited

U.S. PATENT DOCUMENTS 4,975,690 A 12/1990 Torres
5,072,412 A 12/1991 Henderson, Jr. et al.
5,493,692 A 2/1996 Theimer et al.
5,713,073 A 1/1998 Warsta
5,754,939 A 5/1998 Herz et al.
5,832,446 A 11/1998 Neuhaus
5,855,008 A 12/1998 Goldhaber et al.
5,883,639 A 3/1999 Walton et al.
5,999,932 A 12/1999 Paul
6,012,098 A 1/2000 Bayeh et al.
6,014,090 A 1/2000 Rosen et al.
6,029,141 A 2/2000 Bezos et al.
6,038,295 A 3/2000 Mattes
6,049,711 A 4/2000 Yehezkel et al.
6,154,764 A 11/2000 Nitta et al.
6,167,435 A 12/2000 Druckenmiller et al.
6,204,840 B1 3/2001 Petelycky et al.
6,205,432 B1 3/2001 Gabbard et al.
6,216,141 B1 4/2001 Straub et al.
6,285,381 B1 9/2001 Sawano et al.
6,285,987 B1 9/2001 Roth et al.
6,310,694 B1 10/2001 Okimoto et al.
6,317,789 B1 11/2001 Rakavy et al.
6,334,149 B1 12/2001 Davis, Jr. et al.
6,349,203 B1 2/2002 Asaoka et al.
6,353,170 B1 3/2002 Eyzaguirre et al.
6,446,004 B1 9/2002 Cao et al.
6,449,657 B2 9/2002 Stanbach et al.
6,456,852 B2 9/2002 Bar et al.
6,484,196 B1 11/2002 Maurille
6,487,601 B1 11/2002 Hubacher et al.
6,523,008 B1 2/2003 Avrunin
6,542,749 B2 4/2003 Tanaka et al.
6,549,768 B1 4/2003 Fraccaroli
6,618,593 B1 9/2003 Drutman et al.
6,622,174 B1 9/2003 Ukita et al.
6,631,463 B1 10/2003 Floyd et al.
6,636,247 B1 10/2003 Hamzy et al.
6,636,855 B2 10/2003 Holloway et al.
6,643,684 B1 11/2003 Malkin et al.
6,658,095 B1 12/2003 Yoakum et al.
6,665,531 B1 12/2003 Soderbacka et al.
6,668,173 B2 12/2003 Greene
6,684,238 B1 1/2004 Dutta
6,684,257 B1 1/2004 Camut et al.
6,698,020 B1 2/2004 Zigmond et al.
6,700,506 B1 3/2004 Winkler
6,720,860 B1 4/2004 Narayanaswami
6,724,403 B1 4/2004 Santoro et al.
6,757,713 B1 6/2004 Ogilvie et al.
6,832,222 B1 12/2004 Zimowski
6,834,195 B2 12/2004 Brandenberg et al.
6,836,792 B1 12/2004 Chen
6,898,626 B2 5/2005 Ohashi
6,959,324 B1 10/2005 Kubik et al.
6,970,088 B2 11/2005 Kovach
6,970,907 B1 11/2005 Ullmann et al.
6,980,909 B2 12/2005 Root et al.
6,981,040 B1 12/2005 Konig et al.
7,020,494 B2 3/2006 Spriestersbach et al.
7,027,124 B2 4/2006 Foote et al.
7,072,963 B2 7/2006 Anderson et al.
7,085,571 B2 8/2006 Kalhan et al.
7,110,744 B2 9/2006 Freeny, Jr.
7,124,164 B1 10/2006 Chemtob
7,149,893 B1 12/2006 Leonard et al.
7,173,651 B1 2/2007 Knowles
7,188,143 B2 3/2007 Szeto
7,203,380 B2 4/2007 Chiu et al.
7,206,568 B2 4/2007 Sudit
7,227,937 B1 6/2007 Yoakum et al.
7,237,002 B1 6/2007 Estrada et al.
7,240,089 B2 7/2007 Boudreau
7,269,426 B2 9/2007 Kokkonen et al.
7,280,658 B2 10/2007 Amini et al.
7,315,823 B2 1/2008 Brondrup
7,349,768 B2 3/2008 Bruce et al.
7,356,564 B2 4/2008 Hartselle et al.
7,394,345 B1 7/2008 Ehlinger et al.
7,411,493 B2 8/2008 Smith
7,423,580 B2 9/2008 Markhovsky et al.
7,454,442 B2 11/2008 Cobleigh et al.
7,508,419 B2 3/2009 Toyama et al.
7,519,670 B2 4/2009 Hagale et al.
7,535,890 B2 5/2009 Rojas
7,546,554 B2 6/2009 Chiu et al.
7,607,096 B2 10/2009 Oreizy et al.
7,639,943 B1 12/2009 Kalajan
7,650,231 B2 1/2010 Gadler
7,668,537 B2 2/2010 DeVries
7,770,137 B2 8/2010 Forbes et al.
7,778,973 B2 8/2010 Choi
7,779,444 B2 8/2010 Glad
7,787,886 B2 8/2010 Markhovsky et al.
7,796,946 B2 9/2010 Eisenbach
7,801,954 B2 9/2010 Cadiz et al.
7,856,360 B2 12/2010 Kramer et al.
8,001,204 B2 8/2011 Burtner et al.
8,032,586 B2 10/2011 Challenger et al.
8,082,255 B1 12/2011 Carlson, Jr. et al.
8,090,351 B2 1/2012 Klein
8,098,904 B2 1/2012 Ioffe et al.
8,099,109 B2 1/2012 Altman et al.
8,112,716 B2 2/2012 Kobayashi
8,131,597 B2 3/2012 Hudetz
8,135,166 B2 3/2012 Rhoads
8,136,028 B1 3/2012 Loeb et al.
8,146,001 B1 3/2012 Reese
8,161,115 B2 4/2012 Yamamoto
8,161,417 B1 4/2012 Lee
8,195,203 B1 6/2012 Tseng
8,199,747 B2 6/2012 Rojas et al.
8,208,943 B2 6/2012 Petersen
8,214,443 B2 7/2012 Hamburg
8,234,350 B1 7/2012 Gu et al.
8,276,092 B1 9/2012 Narayanan et al.
8,279,319 B2 10/2012 Date
8,280,406 B2 10/2012 Ziskind et al.
8,285,199 B2 10/2012 Hsu et al.
8,287,380 B2 10/2012 Nguyen et al.
8,301,159 B2 10/2012 Hamynen et al.
8,306,922 B1 11/2012 Kunal et al.
8,312,086 B2 11/2012 Velusamy et al.
8,312,097 B1 11/2012 Siegel et al.
8,326,315 B2 12/2012 Phillips et al.
8,326,327 B2 12/2012 Hymel et al.
8,332,475 B2 12/2012 Rosen et al.
8,352,546 B1 1/2013 Dollard
8,379,130 B2 2/2013 Forutanpour et al.
8,385,950 B1 2/2013 Wagner et al.
8,402,097 B2 3/2013 Szeto
8,405,773 B2 3/2013 Hayashi et al.
8,418,067 B2 4/2013 Cheng et al.
8,423,409 B2 4/2013 Rao
8,471,914 B2 6/2013 Sakiyama et al.

(56) References Cited

U.S. PATENT DOCUMENTS

| | | | |
|---|---|---|---|
| 8,472,935 | B1 | 6/2013 | Fujisaki |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,560,612 | B2 | 10/2013 | Kilmer et al. |
| 8,571,580 | B2 | 10/2013 | Altman et al. |
| 8,594,680 | B2 | 11/2013 | Ledlie et al. |
| 8,613,089 | B1 | 12/2013 | Holloway et al. |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,682,350 | B2 | 3/2014 | Altman et al. |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,761,800 | B2 | 6/2014 | Kuwahara |
| 8,768,876 | B2 | 7/2014 | Shim et al. |
| 8,775,972 | B2 | 7/2014 | Spiegel |
| 8,788,680 | B1 | 7/2014 | Naik |
| 8,790,187 | B2 | 7/2014 | Walker et al. |
| 8,797,415 | B2 | 8/2014 | Arnold |
| 8,798,646 | B1 | 8/2014 | Wang et al. |
| 8,856,349 | B2 | 10/2014 | Jain et al. |
| 8,874,677 | B2 | 10/2014 | Rosen et al. |
| 8,886,227 | B2 | 11/2014 | Schmidt et al. |
| 8,909,679 | B2 | 12/2014 | Root et al. |
| 8,909,725 | B1 | 12/2014 | Sehn |
| 8,972,357 | B2 | 3/2015 | Shim et al. |
| 8,995,433 | B2 | 3/2015 | Rojas |
| 9,015,285 | B1 | 4/2015 | Ebsen et al. |
| 9,020,745 | B2 | 4/2015 | Johnston et al. |
| 9,040,574 | B2 | 5/2015 | Wang et al. |
| 9,055,416 | B2 | 6/2015 | Rosen et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,113,301 | B1 | 8/2015 | Spiegel et al. |
| 9,119,027 | B2 | 8/2015 | Sharon et al. |
| 9,123,074 | B2 | 9/2015 | Jacobs et al. |
| 9,128,800 | B2 | 9/2015 | D'Angelo et al. |
| 9,143,382 | B2 | 9/2015 | Bhogal et al. |
| 9,143,681 | B1 | 9/2015 | Ebsen et al. |
| 9,152,477 | B1 | 10/2015 | Campbell et al. |
| 9,165,320 | B1 | 10/2015 | Belvin |
| 9,191,776 | B2 | 11/2015 | Root et al. |
| 9,204,252 | B2 | 12/2015 | Root |
| 9,225,897 | B1 | 12/2015 | Sehn et al. |
| 9,258,459 | B2 | 2/2016 | Hartley |
| 9,342,930 | B1 | 5/2016 | Kraft et al. |
| 9,344,606 | B2 | 5/2016 | Hartley et al. |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,439,041 | B2 | 9/2016 | Parvizi et al. |
| 9,443,227 | B2 | 9/2016 | Evans et al. |
| 9,450,907 | B2 | 9/2016 | Pridmore et al. |
| 9,459,778 | B2 | 10/2016 | Hogeg et al. |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,628,950 | B1 | 4/2017 | Noeth et al. |
| 9,659,225 | B2 | 5/2017 | Joshi et al. |
| 9,710,821 | B2 | 7/2017 | Heath |
| 9,854,219 | B2 | 12/2017 | Sehn |
| 10,321,263 | B1 | 6/2019 | Alkarmi et al. |
| 10,348,658 | B2 | 7/2019 | Rodriguez et al. |
| 10,439,965 | B1 | 10/2019 | Guarraci et al. |
| 10,674,311 | B1 | 6/2020 | Bouba et al. |
| 10,862,836 | B2 | 12/2020 | Mcgregor, Jr. et al. |
| 10,893,385 | B1 | 1/2021 | Berardino et al. |
| 10,936,066 | B1 | 3/2021 | Jaureguiberry et al. |
| 10,939,246 | B1 | 3/2021 | Dancie et al. |
| 10,945,098 | B2 | 3/2021 | Dancie et al. |
| 11,032,670 | B1 | 6/2021 | Baylin et al. |
| 11,039,270 | B2 | 6/2021 | Bouba et al. |
| 11,166,123 | B1 | 11/2021 | Guillaume |
| 11,275,439 | B2 | 3/2022 | Jaureguiberry et al. |
| 11,294,936 | B1 | 4/2022 | Jaureguiberry |
| 11,307,747 | B2 | 4/2022 | Dancie et al. |
| 12,100,065 | B2 | 9/2024 | Eirinberg et al. |
| 12,166,839 | B2 | 12/2024 | Eirinberg et al. |
| 12,363,443 | B2 * | 7/2025 | Swain .................... H04N 23/56 |
| 2002/0047868 | A1 | 4/2002 | Miyazawa |
| 2002/0078456 | A1 | 6/2002 | Hudson et al. |
| 2002/0087631 | A1 | 7/2002 | Sharma |
| 2002/0097257 | A1 | 7/2002 | Miller et al. |
| 2002/0122659 | A1 | 9/2002 | Mcgrath et al. |
| 2002/0128047 | A1 | 9/2002 | Gates |
| 2002/0144154 | A1 | 10/2002 | Tomkow |
| 2003/0001846 | A1 | 1/2003 | Davis et al. |
| 2003/0016247 | A1 | 1/2003 | Lai et al. |
| 2003/0017823 | A1 | 1/2003 | Mager et al. |
| 2003/0020623 | A1 | 1/2003 | Cao et al. |
| 2003/0023874 | A1 | 1/2003 | Prokupets et al. |
| 2003/0037124 | A1 | 2/2003 | Yamaura et al. |
| 2003/0052925 | A1 | 3/2003 | Daimon et al. |
| 2003/0101230 | A1 | 5/2003 | Benschoter et al. |
| 2003/0110503 | A1 | 6/2003 | Perkes |
| 2003/0126215 | A1 | 7/2003 | Udell |
| 2003/0148773 | A1 | 8/2003 | Spriestersbach et al. |
| 2003/0164856 | A1 | 9/2003 | Prager et al. |
| 2003/0229441 | A1 | 12/2003 | Pechatnikov et al. |
| 2003/0229607 | A1 | 12/2003 | Zellweger et al. |
| 2004/0027371 | A1 | 2/2004 | Jaeger |
| 2004/0064429 | A1 | 4/2004 | Hirstius et al. |
| 2004/0078367 | A1 | 4/2004 | Anderson et al. |
| 2004/0111467 | A1 | 6/2004 | Willis |
| 2004/0158739 | A1 | 8/2004 | Wakai et al. |
| 2004/0189465 | A1 | 9/2004 | Capobianco et al. |
| 2004/0203959 | A1 | 10/2004 | Coombes |
| 2004/0215625 | A1 | 10/2004 | Svendsen et al. |
| 2004/0243531 | A1 | 12/2004 | Dean |
| 2004/0243688 | A1 | 12/2004 | Wugofski |
| 2005/0021444 | A1 | 1/2005 | Bauer et al. |
| 2005/0022211 | A1 | 1/2005 | Veselov et al. |
| 2005/0048989 | A1 | 3/2005 | Jung |
| 2005/0078804 | A1 | 4/2005 | Yomoda |
| 2005/0097176 | A1 | 5/2005 | Schatz et al. |
| 2005/0102381 | A1 | 5/2005 | Jiang et al. |
| 2005/0104976 | A1 | 5/2005 | Currans |
| 2005/0114783 | A1 | 5/2005 | Szeto |
| 2005/0119936 | A1 | 6/2005 | Buchanan et al. |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0223066 | A1 | 10/2005 | Buchheit et al. |
| 2005/0288954 | A1 | 12/2005 | McCarthy et al. |
| 2005/0289524 | A1 * | 12/2005 | McGinnes ............. G06Q 10/10<br>717/140 |
| 2006/0026067 | A1 | 2/2006 | Nicholas et al. |
| 2006/0107297 | A1 | 5/2006 | Toyama et al. |
| 2006/0114338 | A1 | 6/2006 | Rothschild |
| 2006/0119882 | A1 | 6/2006 | Harris et al. |
| 2006/0218043 | A1 | 9/2006 | Rosenzweig et al. |
| 2006/0242239 | A1 | 10/2006 | Morishima et al. |
| 2006/0252438 | A1 | 11/2006 | Ansamaa et al. |
| 2006/0265417 | A1 | 11/2006 | Amato et al. |
| 2006/0270419 | A1 | 11/2006 | Crowley et al. |
| 2006/0287878 | A1 | 12/2006 | Wadhwa et al. |
| 2007/0004426 | A1 | 1/2007 | Pfleging et al. |
| 2007/0028162 | A1 | 2/2007 | Griffin et al. |
| 2007/0038715 | A1 | 2/2007 | Collins et al. |
| 2007/0040931 | A1 | 2/2007 | Nishizawa |
| 2007/0073517 | A1 | 3/2007 | Panje |
| 2007/0073823 | A1 | 3/2007 | Cohen et al. |
| 2007/0075898 | A1 | 4/2007 | Markhovsky et al. |
| 2007/0082707 | A1 | 4/2007 | Flynt et al. |
| 2007/0136228 | A1 | 6/2007 | Petersen |

(56) References Cited

U.S. PATENT DOCUMENTS

| | | | |
|---|---|---|---|
| 2007/0192128 | A1 | 8/2007 | Celestini |
| 2007/0198340 | A1 | 8/2007 | Lucovsky et al. |
| 2007/0198495 | A1 | 8/2007 | Buron et al. |
| 2007/0208751 | A1 | 9/2007 | Cowan et al. |
| 2007/0210936 | A1 | 9/2007 | Nicholson |
| 2007/0214180 | A1 | 9/2007 | Crawford |
| 2007/0214216 | A1 | 9/2007 | Carrer et al. |
| 2007/0233556 | A1 | 10/2007 | Koningstein |
| 2007/0233801 | A1 | 10/2007 | Eren et al. |
| 2007/0233859 | A1 | 10/2007 | Zhao et al. |
| 2007/0243887 | A1 | 10/2007 | Bandhole et al. |
| 2007/0244750 | A1 | 10/2007 | Grannan et al. |
| 2007/0255456 | A1 | 11/2007 | Funayama |
| 2007/0281690 | A1 | 12/2007 | Altman et al. |
| 2008/0022329 | A1 | 1/2008 | Glad |
| 2008/0025701 | A1 | 1/2008 | Ikeda |
| 2008/0032703 | A1 | 2/2008 | Krumm et al. |
| 2008/0033930 | A1 | 2/2008 | Warren |
| 2008/0043041 | A2 | 2/2008 | Hedenstroem et al. |
| 2008/0049704 | A1 | 2/2008 | Witteman et al. |
| 2008/0062141 | A1 | 3/2008 | Chandhri |
| 2008/0076505 | A1 | 3/2008 | Ngyen et al. |
| 2008/0092233 | A1 | 4/2008 | Tian et al. |
| 2008/0094387 | A1 | 4/2008 | Chen |
| 2008/0104503 | A1 | 5/2008 | Beall et al. |
| 2008/0109844 | A1 | 5/2008 | Baldeschweiler et al. |
| 2008/0120409 | A1 | 5/2008 | Sun et al. |
| 2008/0147730 | A1 | 6/2008 | Lee et al. |
| 2008/0148150 | A1 | 6/2008 | Mall |
| 2008/0158230 | A1 | 7/2008 | Sharma et al. |
| 2008/0168033 | A1 | 7/2008 | Ott et al. |
| 2008/0168489 | A1 | 7/2008 | Schraga |
| 2008/0189177 | A1 | 8/2008 | Anderton et al. |
| 2008/0207176 | A1 | 8/2008 | Brackbill et al. |
| 2008/0208692 | A1 | 8/2008 | Garaventi et al. |
| 2008/0214210 | A1 | 9/2008 | Rasanen et al. |
| 2008/0222545 | A1 | 9/2008 | Lemay |
| 2008/0255976 | A1 | 10/2008 | Altberg et al. |
| 2008/0256446 | A1 | 10/2008 | Yamamoto |
| 2008/0256577 | A1 | 10/2008 | Funaki et al. |
| 2008/0266421 | A1 | 10/2008 | Takahata et al. |
| 2008/0270938 | A1 | 10/2008 | Carlson |
| 2008/0288338 | A1 | 11/2008 | Wiseman et al. |
| 2008/0306826 | A1 | 12/2008 | Kramer et al. |
| 2008/0313329 | A1 | 12/2008 | Wang et al. |
| 2008/0313346 | A1 | 12/2008 | Kujawa et al. |
| 2008/0318616 | A1 | 12/2008 | Chipalkatti et al. |
| 2009/0006191 | A1 | 1/2009 | Arankalle et al. |
| 2009/0006565 | A1 | 1/2009 | Velusamy et al. |
| 2009/0015703 | A1 | 1/2009 | Kim et al. |
| 2009/0024956 | A1 | 1/2009 | Kobayashi |
| 2009/0030774 | A1 | 1/2009 | Rothschild et al. |
| 2009/0030999 | A1 | 1/2009 | Gatzke et al. |
| 2009/0040324 | A1 | 2/2009 | Nonaka |
| 2009/0042588 | A1 | 2/2009 | Lottin et al. |
| 2009/0058822 | A1 | 3/2009 | Chaudhri |
| 2009/0079846 | A1 | 3/2009 | Chou |
| 2009/0089678 | A1 | 4/2009 | Sacco et al. |
| 2009/0089710 | A1 | 4/2009 | Wood et al. |
| 2009/0093261 | A1 | 4/2009 | Ziskind |
| 2009/0132341 | A1 | 5/2009 | Klinger |
| 2009/0132453 | A1 | 5/2009 | Hangartner et al. |
| 2009/0132665 | A1 | 5/2009 | Thomsen et al. |
| 2009/0148045 | A1 | 6/2009 | Lee et al. |
| 2009/0153492 | A1 | 6/2009 | Popp |
| 2009/0157450 | A1 | 6/2009 | Athsani et al. |
| 2009/0157752 | A1 | 6/2009 | Gonzalez |
| 2009/0160970 | A1 | 6/2009 | Fredlund et al. |
| 2009/0163182 | A1 | 6/2009 | Gatti et al. |
| 2009/0167553 | A1 | 7/2009 | Hong et al. |
| 2009/0177299 | A1 | 7/2009 | Van De Sluis |
| 2009/0192900 | A1 | 7/2009 | Collision |
| 2009/0199242 | A1 | 8/2009 | Johnson et al. |
| 2009/0215469 | A1 | 8/2009 | Fisher et al. |
| 2009/0232354 | A1 | 9/2009 | Camp, Jr. et al. |
| 2009/0234815 | A1 | 9/2009 | Boerries et al. |
| 2009/0239552 | A1 | 9/2009 | Churchill et al. |
| 2009/0249222 | A1 | 10/2009 | Schmidt et al. |
| 2009/0249244 | A1 | 10/2009 | Robinson et al. |
| 2009/0265647 | A1 | 10/2009 | Martin et al. |
| 2009/0288022 | A1 | 11/2009 | Almstrand et al. |
| 2009/0291672 | A1 | 11/2009 | Treves et al. |
| 2009/0292608 | A1 | 11/2009 | Polachek |
| 2009/0319607 | A1 | 12/2009 | Belz et al. |
| 2009/0327073 | A1 | 12/2009 | Li |
| 2010/0062794 | A1 | 3/2010 | Han |
| 2010/0082427 | A1 | 4/2010 | Burgener et al. |
| 2010/0082693 | A1 | 4/2010 | Hugg et al. |
| 2010/0100568 | A1 | 4/2010 | Papin et al. |
| 2010/0113065 | A1 | 5/2010 | Narayan et al. |
| 2010/0130233 | A1 | 5/2010 | Parker |
| 2010/0131880 | A1 | 5/2010 | Lee et al. |
| 2010/0131895 | A1 | 5/2010 | Wohlert |
| 2010/0153144 | A1 | 6/2010 | Miller et al. |
| 2010/0159944 | A1 | 6/2010 | Pascal et al. |
| 2010/0161658 | A1 | 6/2010 | Hamynen et al. |
| 2010/0161831 | A1 | 6/2010 | Haas et al. |
| 2010/0162149 | A1 | 6/2010 | Sheleheda et al. |
| 2010/0183280 | A1 | 7/2010 | Beauregard et al. |
| 2010/0185552 | A1 | 7/2010 | Deluca et al. |
| 2010/0185665 | A1 | 7/2010 | Horn et al. |
| 2010/0191631 | A1 | 7/2010 | Weidmann |
| 2010/0197318 | A1 | 8/2010 | Petersen et al. |
| 2010/0197319 | A1 | 8/2010 | Petersen et al. |
| 2010/0198683 | A1 | 8/2010 | Aarabi |
| 2010/0198694 | A1 | 8/2010 | Muthukrishnan |
| 2010/0198826 | A1 | 8/2010 | Petersen et al. |
| 2010/0198828 | A1 | 8/2010 | Petersen et al. |
| 2010/0198862 | A1 | 8/2010 | Jennings et al. |
| 2010/0198870 | A1 | 8/2010 | Petersen et al. |
| 2010/0198917 | A1 | 8/2010 | Petersen et al. |
| 2010/0201482 | A1 | 8/2010 | Robertson et al. |
| 2010/0201536 | A1 | 8/2010 | Robertson et al. |
| 2010/0214436 | A1 | 8/2010 | Kim et al. |
| 2010/0223128 | A1 | 9/2010 | Dukellis et al. |
| 2010/0223343 | A1 | 9/2010 | Bosan et al. |
| 2010/0250109 | A1 | 9/2010 | Johnston et al. |
| 2010/0257196 | A1 | 10/2010 | Waters et al. |
| 2010/0259386 | A1 | 10/2010 | Holley et al. |
| 2010/0273509 | A1 | 10/2010 | Sweeney et al. |
| 2010/0281045 | A1 | 11/2010 | Dean |
| 2010/0306669 | A1 | 12/2010 | Della Pasqua |
| 2010/0306762 | A1 | 12/2010 | Lindberg et al. |
| 2011/0004071 | A1 | 1/2011 | Faiola et al. |
| 2011/0010205 | A1 | 1/2011 | Richards |
| 2011/0029512 | A1 | 2/2011 | Folgner et al. |
| 2011/0040783 | A1 | 2/2011 | Uemichi et al. |
| 2011/0040804 | A1 | 2/2011 | Peirce et al. |
| 2011/0050909 | A1 | 3/2011 | Ellenby et al. |
| 2011/0050915 | A1 | 3/2011 | Wang et al. |
| 2011/0064388 | A1 | 3/2011 | Brown et al. |
| 2011/0066743 | A1 | 3/2011 | Hurley et al. |
| 2011/0083101 | A1 | 4/2011 | Sharon et al. |
| 2011/0102630 | A1 | 5/2011 | Rukes |
| 2011/0119133 | A1 | 5/2011 | Igelman et al. |
| 2011/0137881 | A1 | 6/2011 | Cheng et al. |
| 2011/0145564 | A1 | 6/2011 | Moshir et al. |
| 2011/0159890 | A1 | 6/2011 | Fortescue et al. |
| 2011/0164163 | A1 | 7/2011 | Bilbrey et al. |
| 2011/0197194 | A1 | 8/2011 | D'Angelo et al. |
| 2011/0202598 | A1 | 8/2011 | Evans et al. |
| 2011/0202968 | A1 | 8/2011 | Nurmi |
| 2011/0211534 | A1 | 9/2011 | Schmidt et al. |
| 2011/0213845 | A1 | 9/2011 | Logan et al. |
| 2011/0215966 | A1 | 9/2011 | Kim et al. |
| 2011/0225048 | A1 | 9/2011 | Nair |
| 2011/0238763 | A1 | 9/2011 | Shin et al. |
| 2011/0255736 | A1 | 10/2011 | Thompson et al. |
| 2011/0273575 | A1 | 11/2011 | Lee |
| 2011/0282799 | A1 | 11/2011 | Huston |
| 2011/0283188 | A1 | 11/2011 | Farrenkopf |
| 2011/0314419 | A1 | 12/2011 | Dunn et al. |
| 2011/0320373 | A1 | 12/2011 | Lee et al. |
| 2012/0028659 | A1 | 2/2012 | Whitney et al. |

(56) References Cited

U.S. PATENT DOCUMENTS

| | | | |
|---|---|---|---|
| 2012/0033718 | A1 | 2/2012 | Kauffman et al. |
| 2012/0036015 | A1 | 2/2012 | Sheikh |
| 2012/0036443 | A1 | 2/2012 | Ohmori et al. |
| 2012/0054797 | A1 | 3/2012 | Skog et al. |
| 2012/0059722 | A1 | 3/2012 | Rao |
| 2012/0062805 | A1 | 3/2012 | Candelore |
| 2012/0084731 | A1 | 4/2012 | Filman et al. |
| 2012/0084835 | A1 | 4/2012 | Thomas et al. |
| 2012/0099800 | A1 | 4/2012 | Llano et al. |
| 2012/0108293 | A1 | 5/2012 | Law et al. |
| 2012/0110096 | A1 | 5/2012 | Smarr et al. |
| 2012/0113143 | A1 | 5/2012 | Adhikari et al. |
| 2012/0113272 | A1 | 5/2012 | Hata |
| 2012/0123830 | A1 | 5/2012 | Svendsen et al. |
| 2012/0123871 | A1 | 5/2012 | Svendsen et al. |
| 2012/0123875 | A1 | 5/2012 | Svendsen et al. |
| 2012/0124126 | A1 | 5/2012 | Alcazar et al. |
| 2012/0124176 | A1 | 5/2012 | Curtis et al. |
| 2012/0124458 | A1 | 5/2012 | Cruzada |
| 2012/0131507 | A1 | 5/2012 | Sparandara et al. |
| 2012/0131512 | A1 | 5/2012 | Takeuchi et al. |
| 2012/0143760 | A1 | 6/2012 | Abulafia et al. |
| 2012/0150978 | A1 | 6/2012 | Monaco |
| 2012/0165100 | A1 | 6/2012 | Lalancette et al. |
| 2012/0166971 | A1 | 6/2012 | Sachson et al. |
| 2012/0169855 | A1 | 7/2012 | Oh |
| 2012/0172062 | A1 | 7/2012 | Altman et al. |
| 2012/0173991 | A1 | 7/2012 | Roberts et al. |
| 2012/0176401 | A1 | 7/2012 | Hayward et al. |
| 2012/0184248 | A1 | 7/2012 | Speede |
| 2012/0197724 | A1 | 8/2012 | Kendall |
| 2012/0200743 | A1 | 8/2012 | Blanchflower et al. |
| 2012/0209924 | A1 | 8/2012 | Evans et al. |
| 2012/0210244 | A1 | 8/2012 | De Francisco Lopez et al. |
| 2012/0212632 | A1 | 8/2012 | Mate et al. |
| 2012/0220264 | A1 | 8/2012 | Kawabata |
| 2012/0226748 | A1 | 9/2012 | Bosworth et al. |
| 2012/0233000 | A1 | 9/2012 | Fisher et al. |
| 2012/0236162 | A1 | 9/2012 | Imamura |
| 2012/0239761 | A1 | 9/2012 | Linner et al. |
| 2012/0250951 | A1 | 10/2012 | Chen |
| 2012/0252418 | A1 | 10/2012 | Kandekar et al. |
| 2012/0254325 | A1 | 10/2012 | Majeti et al. |
| 2012/0265758 | A1 | 10/2012 | Han et al. |
| 2012/0278387 | A1 | 11/2012 | Garcia et al. |
| 2012/0278692 | A1 | 11/2012 | Shi |
| 2012/0290637 | A1 | 11/2012 | Perantatos et al. |
| 2012/0299954 | A1 | 11/2012 | Wada et al. |
| 2012/0304052 | A1 | 11/2012 | Tanaka et al. |
| 2012/0304080 | A1 | 11/2012 | Wormald et al. |
| 2012/0307096 | A1 | 12/2012 | Ford et al. |
| 2012/0307112 | A1 | 12/2012 | Kunishige et al. |
| 2012/0319904 | A1 | 12/2012 | Lee et al. |
| 2012/0323933 | A1 | 12/2012 | He et al. |
| 2012/0324018 | A1 | 12/2012 | Metcalf et al. |
| 2013/0006759 | A1 | 1/2013 | Srivastava et al. |
| 2013/0024757 | A1 | 1/2013 | Doll et al. |
| 2013/0036364 | A1 | 2/2013 | Johnson |
| 2013/0045753 | A1 | 2/2013 | Obermeyer et al. |
| 2013/0050260 | A1 | 2/2013 | Reitan |
| 2013/0055083 | A1 | 2/2013 | Fino |
| 2013/0057587 | A1 | 3/2013 | Leonard et al. |
| 2013/0059607 | A1 | 3/2013 | Herz et al. |
| 2013/0060690 | A1 | 3/2013 | Oskolkov et al. |
| 2013/0063369 | A1 | 3/2013 | Malhotra et al. |
| 2013/0067027 | A1 | 3/2013 | Song et al. |
| 2013/0071093 | A1 | 3/2013 | Hanks et al. |
| 2013/0080254 | A1 | 3/2013 | Thramann |
| 2013/0085790 | A1 | 4/2013 | Palmer et al. |
| 2013/0086072 | A1 | 4/2013 | Peng et al. |
| 2013/0090171 | A1 | 4/2013 | Holton et al. |
| 2013/0090959 | A1 | 4/2013 | Kvamme et al. |
| 2013/0095857 | A1 | 4/2013 | Garcia et al. |
| 2013/0097238 | A1 | 4/2013 | Rogers et al. |
| 2013/0104053 | A1 | 4/2013 | Thornton et al. |
| 2013/0110885 | A1 | 5/2013 | Brundrett, III |
| 2013/0111514 | A1 | 5/2013 | Slavin et al. |
| 2013/0128059 | A1 | 5/2013 | Kristensson |
| 2013/0129252 | A1 | 5/2013 | Lauper |
| 2013/0132477 | A1 | 5/2013 | Bosworth et al. |
| 2013/0145286 | A1 | 6/2013 | Feng et al. |
| 2013/0159110 | A1 | 6/2013 | Rajaram et al. |
| 2013/0159919 | A1 | 6/2013 | Leydon |
| 2013/0169822 | A1 | 7/2013 | Zhu et al. |
| 2013/0173729 | A1 | 7/2013 | Starenky et al. |
| 2013/0182133 | A1 | 7/2013 | Tanabe |
| 2013/0185131 | A1 | 7/2013 | Sinha et al. |
| 2013/0191198 | A1 | 7/2013 | Carlson et al. |
| 2013/0194301 | A1 | 8/2013 | Robbins et al. |
| 2013/0198176 | A1 | 8/2013 | Kim |
| 2013/0218965 | A1 | 8/2013 | Abrol et al. |
| 2013/0218968 | A1 | 8/2013 | Mcevilly et al. |
| 2013/0222323 | A1 | 8/2013 | Mckenzie |
| 2013/0227476 | A1 | 8/2013 | Frey |
| 2013/0232194 | A1 | 9/2013 | Knapp et al. |
| 2013/0263031 | A1 | 10/2013 | Oshiro et al. |
| 2013/0265450 | A1 | 10/2013 | Barnes, Jr. |
| 2013/0267253 | A1 | 10/2013 | Case et al. |
| 2013/0275164 | A1 | 10/2013 | Gruber et al. |
| 2013/0275505 | A1 | 10/2013 | Gauglitz et al. |
| 2013/0290443 | A1 | 10/2013 | Collins et al. |
| 2013/0304646 | A1 | 11/2013 | De Geer |
| 2013/0311255 | A1 | 11/2013 | Cummins et al. |
| 2013/0325964 | A1 | 12/2013 | Berberat |
| 2013/0335418 | A1 | 12/2013 | Kim et al. |
| 2013/0344896 | A1 | 12/2013 | Kirmse et al. |
| 2013/0346869 | A1 | 12/2013 | Asver et al. |
| 2013/0346877 | A1 | 12/2013 | Borovoy et al. |
| 2014/0006129 | A1 | 1/2014 | Heath |
| 2014/0011538 | A1 | 1/2014 | Mulcahy et al. |
| 2014/0019264 | A1 | 1/2014 | Wachman et al. |
| 2014/0032682 | A1 | 1/2014 | Prado et al. |
| 2014/0040862 | A1 | 2/2014 | Webster et al. |
| 2014/0043204 | A1 | 2/2014 | Basnayake et al. |
| 2014/0045530 | A1 | 2/2014 | Gordon et al. |
| 2014/0047016 | A1 | 2/2014 | Rao |
| 2014/0047045 | A1 | 2/2014 | Baldwin et al. |
| 2014/0047335 | A1 | 2/2014 | Lewis et al. |
| 2014/0049652 | A1 | 2/2014 | Moon et al. |
| 2014/0052485 | A1 | 2/2014 | Shidfar |
| 2014/0052633 | A1 | 2/2014 | Gandhi |
| 2014/0057660 | A1 | 2/2014 | Wager |
| 2014/0082651 | A1 | 3/2014 | Sharifi |
| 2014/0092130 | A1 | 4/2014 | Anderson et al. |
| 2014/0096029 | A1 | 4/2014 | Schultz |
| 2014/0114565 | A1 | 4/2014 | Aziz et al. |
| 2014/0122658 | A1 | 5/2014 | Haeger et al. |
| 2014/0122787 | A1 | 5/2014 | Shalvi et al. |
| 2014/0129953 | A1 | 5/2014 | Spiegel |
| 2014/0143143 | A1 | 5/2014 | Fasoli et al. |
| 2014/0147829 | A1 | 5/2014 | Jerauld |
| 2014/0149519 | A1 | 5/2014 | Redfern et al. |
| 2014/0155102 | A1 | 6/2014 | Cooper et al. |
| 2014/0172570 | A1 | 6/2014 | Arcas et al. |
| 2014/0173424 | A1 | 6/2014 | Hogeg et al. |
| 2014/0173457 | A1 | 6/2014 | Wang et al. |
| 2014/0189592 | A1 | 7/2014 | Benchenaa et al. |
| 2014/0207679 | A1 | 7/2014 | Cho |
| 2014/0214471 | A1 | 7/2014 | Schreiner, III |
| 2014/0215025 | A1 | 7/2014 | Quan et al. |
| 2014/0222564 | A1 | 8/2014 | Kranendonk et al. |
| 2014/0229863 | A1 | 8/2014 | St. Clair |
| 2014/0258405 | A1 | 9/2014 | Perkin |
| 2014/0265359 | A1 | 9/2014 | Cheng et al. |
| 2014/0266703 | A1 | 9/2014 | Dalley, Jr. et al. |
| 2014/0279061 | A1 | 9/2014 | Elimeliah et al. |
| 2014/0279436 | A1 | 9/2014 | Dorsey et al. |
| 2014/0279540 | A1 | 9/2014 | Jackson |
| 2014/0280537 | A1 | 9/2014 | Pridmore et al. |
| 2014/0282096 | A1 | 9/2014 | Rubinstein et al. |
| 2014/0287779 | A1 | 9/2014 | O'Keefe et al. |
| 2014/0289833 | A1 | 9/2014 | Briceno |
| 2014/0306986 | A1 | 10/2014 | Gottesman et al. |
| 2014/0317302 | A1 | 10/2014 | Naik |

(56) References Cited

U.S. PATENT DOCUMENTS

2014/0324627 A1 10/2014 Haver et al.
2014/0324629 A1 10/2014 Jacobs
2014/0325383 A1 10/2014 Brown et al.
2015/0020086 A1 1/2015 Chen et al.
2015/0046278 A1 2/2015 Pei et al.
2015/0071619 A1 3/2015 Brough
2015/0087263 A1 3/2015 Branscomb et al.
2015/0088622 A1 3/2015 Ganschow et al.
2015/0095020 A1 4/2015 Leydon
2015/0096042 A1 4/2015 Mizrachi
2015/0116529 A1 4/2015 Wu et al.
2015/0169827 A1 6/2015 Laborde
2015/0172534 A1 6/2015 Miyakawa et al.
2015/0178260 A1 6/2015 Brunson
2015/0222814 A1 8/2015 Li et al.
2015/0261917 A1 9/2015 Smith
2015/0312184 A1 10/2015 Langholz et al.
2015/0350136 A1 12/2015 Flynn, III et al.
2015/0365795 A1 12/2015 Allen et al.
2015/0378502 A1 12/2015 Hu et al.
2016/0006927 A1 1/2016 Sehn
2016/0014063 A1 1/2016 Hogeg et al.
2016/0085773 A1 3/2016 Chang et al.
2016/0085863 A1 3/2016 Allen et al.
2016/0099901 A1 4/2016 Allen et al.
2016/0132549 A1* 5/2016 Johnson ............ G06F 16/24568 707/602
2016/0180887 A1 6/2016 Sehn
2016/0182422 A1 6/2016 Sehn et al.
2016/0182875 A1 6/2016 Sehn
2016/0239248 A1 8/2016 Sehn
2016/0277419 A1 9/2016 Allen et al.
2016/0321708 A1 11/2016 Sehn
2016/0352659 A1 12/2016 Krishnamoorth
2017/0006094 A1 1/2017 Abou Mahmoud et al.
2017/0034085 A1 2/2017 Bijor et al.
2017/0061308 A1 3/2017 Chen et al.
2017/0109328 A1 4/2017 Kim et al.
2017/0287006 A1 10/2017 Azmoodeh et al.
2018/0088752 A1 3/2018 Wakerly et al.
2018/0300399 A1 10/2018 Blandin et al.
2018/0304159 A1 10/2018 Campos et al.
2019/0394147 A1 12/2019 Rodriguez et al.
2020/0134101 A1 4/2020 Goenka et al.
2020/0234045 A1 7/2020 Palomo et al.
2020/0236074 A1 7/2020 Kim
2020/0314586 A1 10/2020 Bouba et al.
2020/0382912 A1 12/2020 Dancie et al.
2020/0401225 A1 12/2020 Jaureguiberry et al.
2021/0011612 A1 1/2021 Dancie et al.
2021/0150931 A1* 5/2021 Ponthanplavil Razallian ............. H04L 67/306
2021/0152979 A1 5/2021 Berardino et al.
2021/0266704 A1 8/2021 Dancie et al.
2021/0357966 A1* 11/2021 Michel ............... G06Q 20/3267
2021/0377693 A1 12/2021 Bouba et al.
2021/0409904 A1 12/2021 Baylin et al.
2022/0174455 A1 6/2022 Guillaume
2022/0237646 A1* 7/2022 Michel ............... G06Q 20/3267
2022/0269345 A1 8/2022 Jaureguiberry et al.
2023/0137153 A1 5/2023 Eirinberg et al.
2023/0140504 A1 5/2023 Eirinberg et al.
2023/0147131 A1* 5/2023 Zhou ..................... H04L 5/0044 370/329
2024/0412423 A1* 12/2024 Eirinberg ............... G06Q 10/40

FOREIGN PATENT DOCUMENTS

EP 2051480 A1 4/2009
EP 2151797 A1 2/2010
EP 2428915 A2 3/2012
GB 2399928 A 9/2004
KR 19990073076 A 10/1999
KR 20010078417 A 8/2001
KR 20200129187 A 11/2020
WO WO-1996024213 A1 8/1996
WO WO-1999063453 A1 12/1999
WO WO-2000058882 A1 10/2000
WO WO-2001029642 A1 4/2001
WO WO-2001050703 A3 7/2001
WO WO-2006118755 A2 11/2006
WO WO-2007092668 A2 8/2007
WO WO-2009043020 A2 4/2009
WO WO-2011040821 A1 4/2011
WO WO-2011119407 A1 9/2011
WO WO-2013008238 A1 1/2013
WO WO-2013045753 A1 4/2013
WO WO-2014006129 A1 1/2014
WO WO-2014068573 A1 5/2014
WO WO-2014115136 A1 7/2014
WO WO-2014194262 A2 12/2014
WO WO-2015192026 A1 12/2015
WO WO-2016044424 A1 3/2016
WO WO-2016054562 A1 4/2016
WO WO-2016065131 A1 4/2016
WO WO-2016100318 A2 6/2016
WO WO-2016100318 A3 6/2016
WO WO-2016100342 A1 6/2016
WO WO-2016149594 A1 9/2016
WO WO-2016179166 A1 11/2016
WO WO-2016210354 A1 12/2016
WO WO-2017214677 A1 12/2017
WO WO-2020013802 A1 1/2020
WO WO-2023076231 A1 5/2023
WO WO-2023076360 A1 5/2023

OTHER PUBLICATIONS

Luhur HS, Widjaja ND. Location-based social networking media for restaurant promotion and food review using mobile application. InEPJ Web of Conferences 2014 (vol. 68, p. 00022). EDP Sciences.*

Khadka S, Chaise PS, Shrestha S, Maharjan SB. Restaurant recommendation system using user based collaborative filtering. Asian Journal of Electrical Sciences. Sep. 15, 2020;9(2):17-24.*

Lim KH, Chan J, Karunasekera S, Leckie C. Tour recommendation and trip planning using location-based social media: A survey. Knowledge and Information Systems. Sep. 1, 2019;60(3):1247-75.*

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: < URL: http://pages.ebay.com/help/sell/pictures.html>, (accessed May 24, 2017), 4 pgs.

"U.S. Appl. No. 17/456,775, Examiner Interview Summary mailed Jul. 8, 2024", 3 pgs.

"U.S. Appl. No. 17/456,775, Notice of Allowance mailed Aug. 5, 2024", 13 pgs.

"U.S. Appl. No. 17/456,775, Response filed Jul. 9, 2024 to Final Office Action mailed May 10, 2024", 11 pgs.

"BlogStomp", StompSoftware, [Online] Retrieved from the Internet: <URL: http://stompsoftware.com/blogstomp>, (accessed May 24, 2017), 12 pgs.

"Chinese Application Serial No. 202280073119.4, Notification to Make Rectification (210302) mailed May 29, 2024", With English Machine Translation, 2 pgs.

"Chinese Application Serial No. 202280073119.4, Response filed Jun. 20, 2024 to Notification to Make Rectification (210302) mailed May 29, 2024", With English Machine Translation, 22 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

(56) References Cited

OTHER PUBLICATIONS

"International Application Serial No. PCT/US2015/037251, International Search Report mailed Sep. 29, 2015", 2 pgs.
"International Application Serial No. PCT/US2022/047680, International Preliminary Report on Patentability mailed May 10, 2024", 8 pgs.
"International Application Serial No. PCT/US2022/047855, International Preliminary Report on Patentability mailed May 10, 2024", 9 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J 0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"U.S. Appl. No. 17/456,754, Corrected Notice of Allowability mailed May 30, 2024", 2 pgs.
"U.S. Appl. No. 17/456,754, Final Office Action mailed Jan. 2, 2024", 21 pgs.
"U.S. Appl. No. 17/456,754, Non Final Office Action mailed Aug. 17, 2023", 15 pgs.
"U.S. Appl. No. 17/456,754, Notice of Allowance mailed May 23, 2024", 7 pgs.
"U.S. Appl. No. 17/456,754, Response filed Feb. 1, 2024 to Final Office Action mailed Jan. 2, 2024", 10 pgs.
"U.S. Appl. No. 17/456,754, Response filed Sep. 27, 2023 to Non Final Office Action mailed Aug. 17, 2023", 9 pgs.
"U.S. Appl. No. 17/456,775, Final Office Action mailed May 10, 2024", 22 pgs.
"U.S. Appl. No. 17/456,775, Non Final Office Action mailed Aug. 22, 2023", 20 pgs.
"U.S. Appl. No. 17/456,775, Non Final Office Action mailed Dec. 18, 2023", 21 pgs.
"U.S. Appl. No. 17/456,775, Response filed Mar. 15, 2024 to Non Final Office Action mailed Dec. 18, 2023", 11 pgs.
"U.S. Appl. No. 17/456,775, Response filed May 3, 2023 to Restriction Requirement mailed Mar. 3, 2023", 9 pgs.
"U.S. Appl. No. 17/456,775, Response filed Oct. 23, 2023 to Non Final Office Action mailed Aug. 22, 2023", 10 pgs.
"U.S. Appl. No. 17/456,775, Restriction Requirement mailed Mar. 3, 2023", 7 pgs.
"How to Create Menu Card Animation | Tutorial | After Effects CC | Parts 01-04", Raahz Cocept, [Online]. Retrieved from the Internet: <https://www.youtube.com/@raahzconcept5727>, (Sep.-Oct. 2020), 1 pg.
"International Application Serial No. PCT/US2022/047680, International Search Report mailed Jan. 27, 2023", 5 pgs.
"International Application Serial No. PCT/US2022/047680, Written Opinion mailed Jan. 27, 2023", 6 pgs.
"International Application Serial No. PCT/US2022/047855, International Search Report mailed Feb. 3, 2023", 4 pgs.
"International Application Serial No. PCT/US2022/047855, Written Opinion mailed Feb. 3, 2023", 7 pgs.
Atawneh, Samer, et al., "Android-based mobile application for door-to-door product delivery", (2019), 125-142.
Domokos, Cristina-Edina, et al., "Netfood: A software system for food ordering and delivery", IEEE 16th International Symposium on Intelligent Systems and Informatics (SISY). IEEE, (2018), 6 pgs.
Khan, RH, et al., "Smart store: the convergence of IKEA department store, augmented reality and RFID technology", Vaxjo, Sweden: Linnaeus University, (2018).
Ricky, Michael Yosep, "Mobile food ordering application using android os platform", EPJ Web of Conferences. vol. 68. EDP Sciences, (2014), 8 pgs.
Souza-Herod, P, et al., "Augmented reality shopping framework", InSoutheastCon IEEE, (Mar. 10, 2021), 1-6.
Thompson, M, et al., "Mobile Augmented Reality for Grocery Shopping", InSymposium (MICS) Conference, Duluth, (2011).
"European Application Serial No. 22812953.2, Response to Communication Pursuant to Rules 161 and 162 EPC Filed Nov. 21, 2024", 20 pgs.
"European Application Serial No. 22812930.0 , Response to Communication Pursuant to Rules 161 and 162 EPC Filed Nov. 27, 2024", 19 pgs.
"Korean Application Serial No. 10-2024-7018093, Notice of Preliminary Rejection mailed Mar. 26, 2026", w/ English Translation, 14 pgs.
"European Application Serial No. 22812930.0, Communication Pursuant to Article 94(3) EPC mailed Jul. 8, 2026", 11 pgs.
Zdun, Uwe, "Dynamically generating web application fragments from page templates", Proceedings of the 2002 ACM symposium on Applied computing, (Mar. 11, 2002), 1113-1120.

* cited by examiner

ADDING GRAPHICAL REPRESENTATION OF REAL-WORLD OBJECT

CLAIM OF PRIORITY

This application is a continuation of U.S. patent application Ser. No. 17/456,754, filed on Nov. 29, 2021, which claims the benefit of priority to U.S. Provisional Application Ser. No. 63/273,341, filed on Oct. 29, 2021, which are incorporated herein by reference in their entireties.

TECHNICAL FIELD

The present disclosure relates generally to presenting content obtained from web-based applications using a messaging application.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
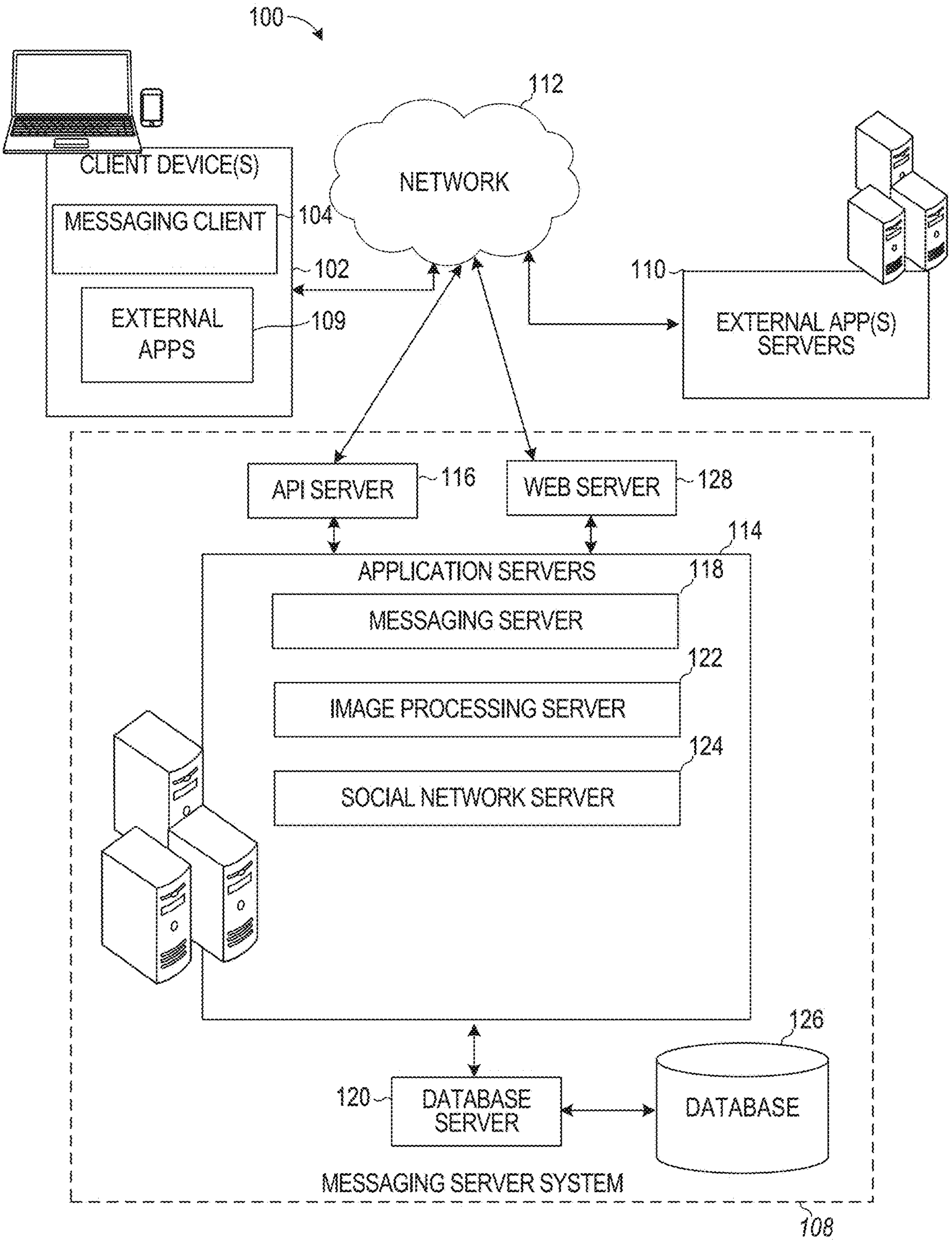
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, messaging applications allow users to access various web-based applications to obtain a variety of information or play games. For example, a messaging application can launch a reservation web-based application to enable a user to view, access, or make reservations at different restaurants. As another example, a messaging application can launch a fitness web-based application to enable a user to track various fitness information. Each different web-based application can provide access to different types of information and tools.

In many cases, a variety of different web-based applications can be associated with a common goal of a user or have certain aspects in common. Namely, a user can access an image and may desire to add various stickers to the image. In one example, the user may desire to add a reference to a food item depicted in the image. To do so, the user has to navigate away from the image to access the menu of the restaurant. Namely, the typical messaging application has to launch a separate display of a web-based application that provides access to restaurant menus. After launching that separate display, a user has to manually search for the restaurant corresponding to the image that was previously displayed to access the restaurant menu. Then the user has to find a menu item of interest and then navigate back to the image to insert a description corresponding to the menu item of interest. Even still, the description may not fully represent the food idem depicted in the image and can be misleading. This navigation through multiple pages of information is tedious and time consuming which takes away from the overall appeal of using the messaging applications. Also, launching separate web-based applications to accomplish certain unique tasks each time consumes a great deal of resources.

The disclosed techniques improve the efficiency of using the electronic device by automatically displaying a list of items corresponding to a real-world object depicted in an image. The electronic device can receive input that selects a given item and automatically adds a graphical representation of the given item to the image. This avoids having the user navigate through multiple pages of information to add a desired graphical element or description of the real-world object. Specifically, by automatically presenting the user with available items that describe a depicted real-world object within the same display that provides the image of the real-world object and then augmenting the image with a representation of a selected item, the disclosed techniques speed up and improve the process of modifying images.

In an example, the disclosed techniques generate a template for an image modification page of a messaging application and associate one or more application fragments with the template. Each associated application fragment corresponds to unique and specific information provided by different respective web-based applications. The unique and specific information pertains to the common goal or the common aspects of a current page of the messaging application that is being displayed, such as adding references or graphical elements that describe a real-world object, such as a food item or garment. The disclosed examples obtain the unique and specific information from the different respective web-based applications associated with a given page being viewed and render a display of visual representations of the obtained unique and specific information in the one or more application fragments that are associated with the page. Namely, the disclosed examples communicate with the web-based applications to obtain, based on an image depicting a real-world object associated with a location, a list of items available for purchase at a given venue (e.g., restaurant or store) and the corresponding graphical elements that represent each of the items on the list. The disclosed examples can receive a user selection of a given item from the list that is displayed on top of or adjacent to the image and, in response, add the corresponding graphical element to the image.

In one implementation, the image presented on a page of the messaging application can depict a real-world food item. The image can be captured or received from a client device that is at a particular location. The messaging application can automatically (e.g., in response to a request to augment the image) present a list of menu items available at a restaurant that is within a threshold proximity of the particular location. The messaging application can receive input that selects a given menu item (e.g., that corresponds to the real-world food item) and adds a graphical representation corresponding to the given menu item to the image.

In this way, the disclosed examples can provide access to a collection of information from different web-based applications for modifying an image displayed by the messaging application. For example, the disclosed examples, in the same page that presents an image that depicts a real-world object, can provide information about items that are available for purchase at a venue corresponding to a location of the messaging application (obtained from one or more web-based applications). Within that page, the disclosed examples can receive a selection of a given item and overlay a graphical representation of the given item. By automatically obtaining contextually relevant information for a given page of the messaging application (e.g., that includes an image that depicts a real-world object and tools for modifying the image) from various web-based applications, the messaging applications avoid the need to have the user navigate through multiple pages of information and launch multiple full-scale, web-based applications separately to access such contextually relevant information for the given page of the messaging application. This reduces the overall amount of resources and increases the overall appeal of using the messaging application.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
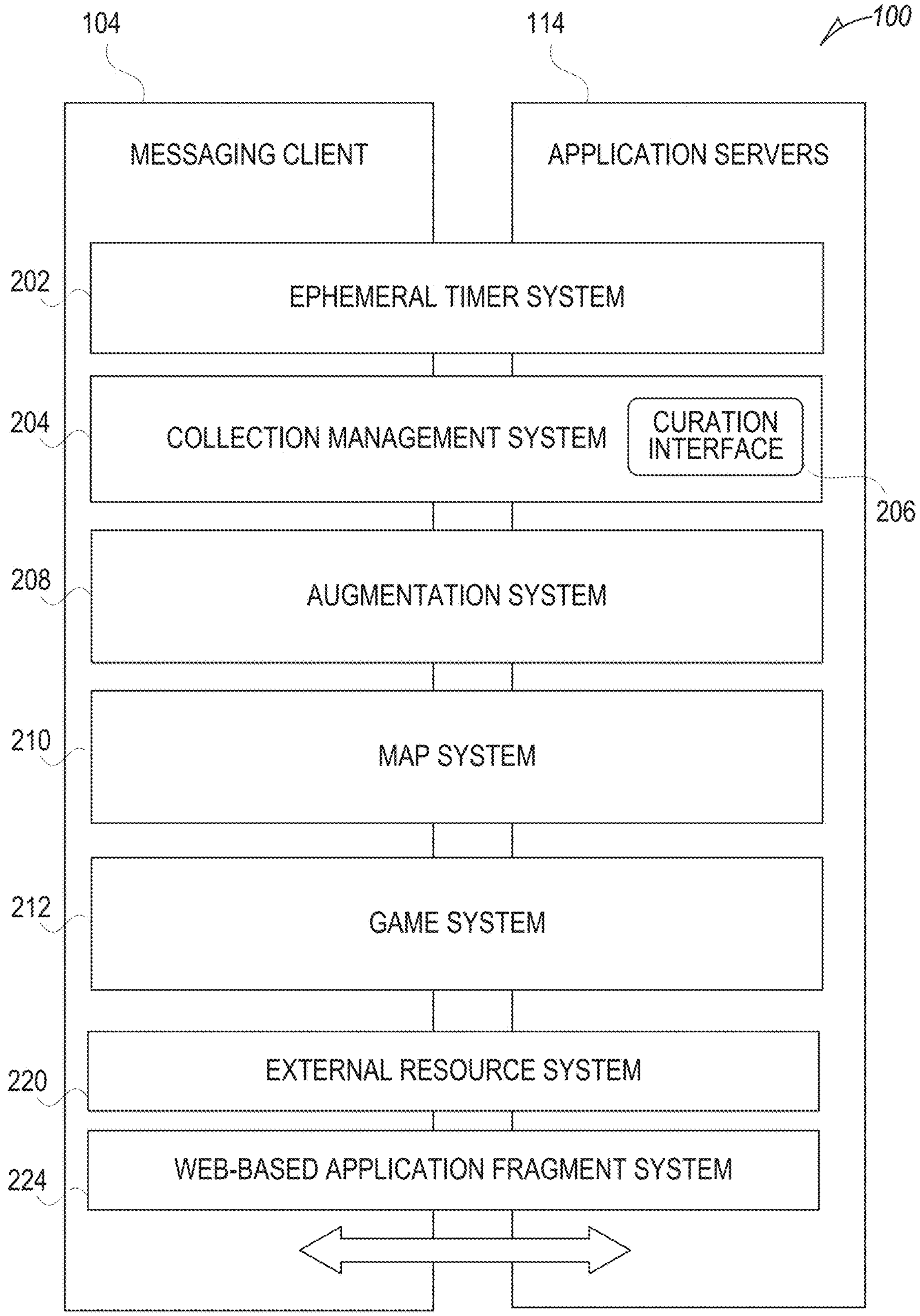
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality (AR) experiences on a client device 102 when an image is captured by the client device 102. Specifically, the messaging client 104 on the client device 102 can be used to activate a camera. The camera displays one or more real-time images or a video to a user along with one or more icons, markers or identifiers of one or more AR experiences. The user can select a given one of the identifiers to launch the corresponding AR experience or perform a desired image modification. The image processing server 122 can receive a video and/or one or more images captured by the client device 102. The image processing server 122 can perform feature analysis and object recognition on the received video and/or one or more images to identify and detect one or more real-world objects that are depicted in the received video and/or images. The image processing server 122 can access features and/or attributes of each real-world object that is detected from a database or by searching the Internet. In response to detecting the real-world objects, the image processing server 122 can generate a list of identifiers of real-world objects being depicted in the video and/or images and can associate the one or more attributes or features with each object in the list.

Figure 3:
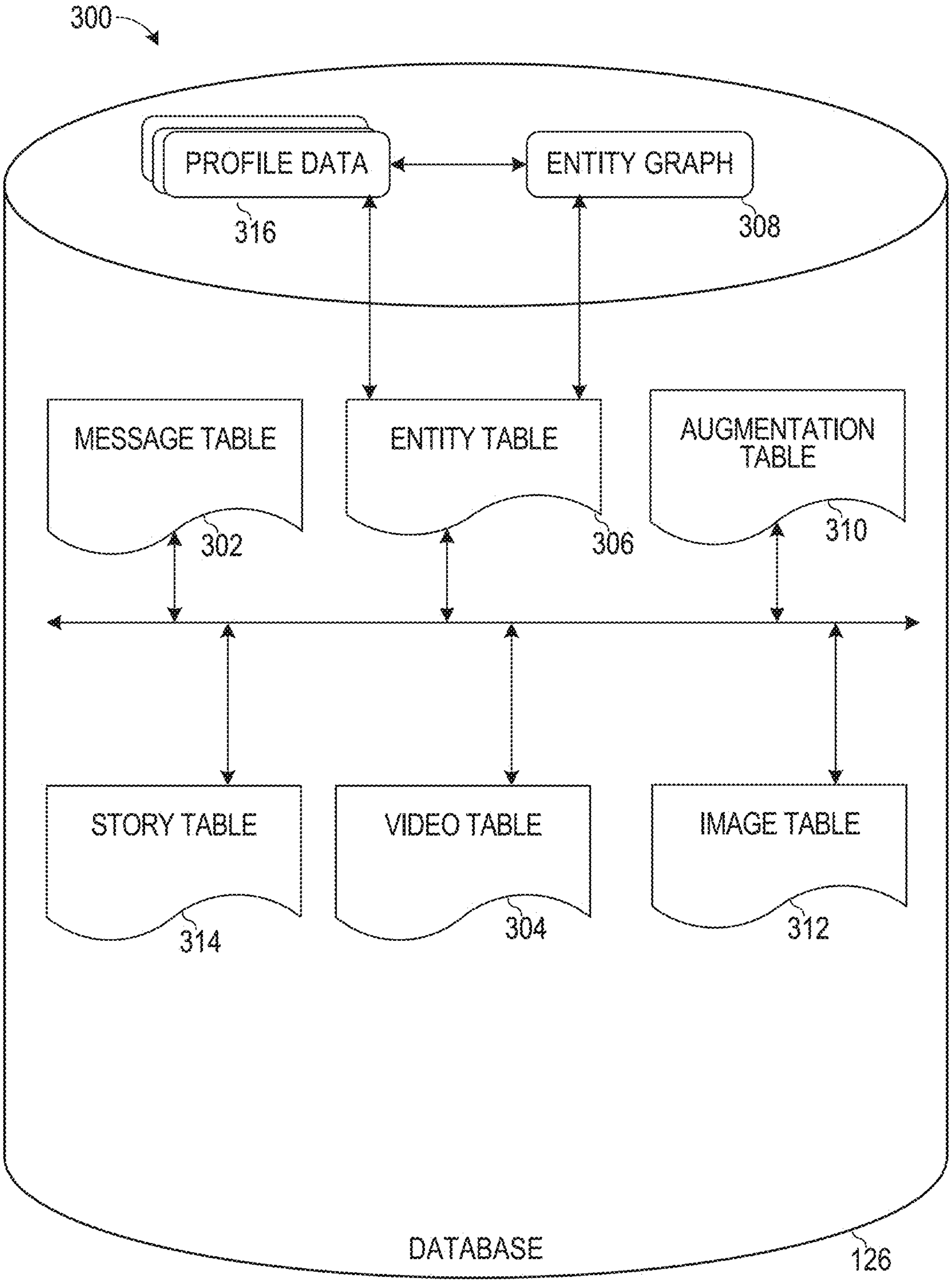
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app") or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application (e.g., web-based application) and is embedded in the messaging client 104. In addition to using markup-language documents (e.g., a .*ml file), an applet may incorporate a scripting language (e.g., a .*js file or a .json file) and a style sheet (e.g., a .*ss file).

In some implementations, some of the web-based applications include, are associated with, and/or provide web-based application fragments. Web-based application fragments define one or more visual elements, such as icons, markers, tools, options, or menus that include data fields. The data fields are used to represent content obtained from the corresponding web-based applications based on the contextual placement (e.g., a page of the messaging client 104 that includes the visual elements) of the web-based application fragments. Namely, the web-based applications can provide visual elements that are configured with and associated with instructions for retrieving specified content from the web-based applications. The visual elements with the instructions are used to define and generate web-based application fragments. The web-based application fragments can, in this way, provide information associated with a certain feature of many features available on the corresponding web-based application.

In an example, a first web-based application corresponding to restaurant reservations can include many different features. Such features include searching for restaurants, reading reviews about the restaurants, viewing menus, and making reservations at the restaurants. The first web-based application can generate or provide a first web-based application fragment that includes a data field representing only one or more particular features of the many different features. For example, the first web-based application fragment can be an icon or marker with a data field that represents reservation times or any other of the many different features of the first web-based application. When placed within a given page of the messaging client 104, such as a venue profile page, the first web-based application fragment can be used to retrieve and provide available reservation times for the restaurant represented by the venue profile page being viewed. Namely, the venue profile page can include a venue template that identifies a visual type of the first web-based application fragment and a display location within the venue profile page. The messaging client 104 can determine that the first web-based application fragment included in the venue template includes a data field (e.g., corresponding to reservations). The messaging client 104 can obtain instructions from the first web-based application fragment that identify the corresponding first web-based application and that specify one or more attributes of the venue profile page being viewed. The one or more attributes may be needed to populate the data field.

In an example, the messaging client 104 generates a communication or message that includes the one or more attributes (e.g., the name of the restaurant and the current time and location) and that includes a request for available reservation times corresponding to the data field. The messaging client 104 transmits the communication or message to the first web-based application. The first web-based application (without being navigated to or launched) searches for the restaurants matching the one or more attributes and retrieves the available reservation times (e.g., the data field). The first web-based application generates a message or communication with the requested data field (e.g., the available reservation times). The first web-based application transmits the message or communication back to the messaging client 104. The messaging client 104 populates the data field of the first web-based application fragment to generate the visual identifier of the first web-based application fragment that includes the content obtained from the first web-based application based on the current context being displayed by the messaging client 104.

The messaging client 104 can determine that the venue profile template of the current venue profile page being viewed is also associated with a second web-based application fragment. The second web-based application fragment can be associated with a second web-based application. The second web-based application can correspond to restaurant reviews and can include many different features. Such features include searching for restaurants, restaurant reviews, viewing menus, and making reservations at the restaurants. The second web-based application can generate or provide a second web-based application fragment that includes a data field representing only one or more particular features of the many different features. For example, the second web-based application fragment can be an icon or marker with a data field that represents reviews for a restaurant. When placed within a given page of the messaging client 104, such as a venue profile page, the second web-based application fragment can be used to retrieve and provide available reviews for the restaurant represented by the venue profile page being viewed.

In an example, the messaging client 104 can determine that the second web-based application fragment included in the venue template includes a data field (e.g., corresponding to reviews). The messaging client 104 can obtain instructions from the second web-based application fragment that identify the corresponding second web-based application and that specify one or more attributes of the venue profile page being viewed. The one or more attributes may be needed to populate the data field.

The messaging client 104 generates a communication or message that includes the one or more attributes (e.g., the name of the restaurant and location) and that includes a request for available reviews corresponding to the data field. The messaging client 104 transmits the communication or message to the second web-based application. The second web-based application (without being navigated to or launched) searches for the restaurants matching the one or more attributes and retrieves the available reviews (e.g., the data field). The second web-based application generates a message or communication with the requested data field (e.g., the available reviews). The second web-based application transmits the message or communication back to the messaging client 104. The messaging client 104 populates the data field of the second web-based application fragment to generate a second visual identifier of the second web-based application fragment that includes the content obtained from the second web-based application based on the current context being displayed by the messaging client 104.

The messaging client 104 can present the second visual identifier of the second web-based application fragment (corresponding to restaurant reviews) together with or separate from the visual identifier of the first web-based application fragment (corresponding to reservation times). The visual identifiers can be selected to launch the respective web-based application and specifically to present the feature corresponding to the web-based application fragment in a new page of the web-based application. In an implementation, the user can navigate to a desired page (e.g., a venue profile page) using the messaging client 104 and the messaging client 104 can automatically present information obtained from different web-based applications on the same venue profile page using respective web-based application fragments. In this way, the messaging client 104 can automatically present information that may be of interest to a user while accessing a given page of the messaging client 104 without having to navigate to respective web-based applications to accomplish a task or access information. Namely, the user may not need to access and launch the restaurant reservations first web-based application while viewing a venue profile page for the restaurant in order to access reservation times as this information is immediately available on the same venue profile page of the restaurant through the visual identifier of the first web-based application fragment. Similarly, the user may not need to access and launch the restaurant reviews second web-based application while viewing a venue profile page for the restaurant in order to access reviews as this information is immediately available on the same venue profile page of the restaurant through the visual identifier of the second web-based application fragment. This exposes the user to a multitude of information from many different sources on the same page which avoids navigating through multiple pages of information and increases the overall efficiency of the device and reduces resource consumption.

In an example, in response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon or marker, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application (web-based applications) can be launched by the messaging client 104 receiving, from an external app(s) server 110, a markup-language document associated with the small-scale external application and processing such a document. These small-scale external applications can provide small-scale external application fragments similar to the web-based application fragments, discussed above and below.

As another example, a third web-based application corresponding to restaurant menu pages can be provided. The third web-based application can generate or provide a third web-based application fragment that includes a data field representing a list of menu items available for purchase at a given restaurant. The third web-based application can also provide graphical elements that represent each menu item in the list of menu items. The graphical representation can include stylized text, images and/or animations that represent a given menu item.

The third web-based application fragment can be an icon or marker or tool that is presented among a list of tools available for modifying a given image. The third web-based application fragment can include a data field that represents a list of menu items received from the third web-based application. Specifically, a page of the messaging client 104 can be accessed in response to capturing an image with the client device 102. The page can present the image or video that was captured along with various tools for modifying the image. Such tools can include an option to sketch a drawing on the image, add text, add information identifying a location where the image or video was captured, add one or more augmented reality elements, change a background/foreground, and add a graphical element representing a menu item corresponding to a real-world object (e.g., a food item) depicted by the image or video. In response to receiving a user selection of the add the graphical element representing a menu item option, the messaging client 104 accesses the third web-based application fragment to retrieve and display available menu items for the restaurant represented by the image displayed on the page being viewed.

Specifically, the messaging client 104 can determine that the third web-based application fragment included in the template (corresponding to the page that includes the image or video) includes a data field (e.g., corresponding to menu items and/or graphical elements representing each menu item). The messaging client 104 can obtain instructions from the third web-based application fragment that identify the corresponding third web-based application and that specify one or more attributes of the page being viewed. The one or more attributes may be needed to populate the data field. Such attributes can include a location associated with the image displayed on the page and/or a current location of the client device 102. In one example, the messaging client 104 identifies a plurality of restaurants that are within a threshold proximity (e.g., 1 kilometer) of the location associated with the image and/or the current location of the client device 102. The messaging client 104 then selects a given one of the restaurants that is closest to the client device 102 or the location associated with the image to use and provide as the attributes of the page that are sent to the third web-based application.

The messaging client 104 generates a communication or message that includes the one or more attributes (e.g., the location associated with the image displayed on the page and/or a current location of the client device 102 and/or the restaurant name) and that includes a request for available menu items corresponding to the data field. The messaging client 104 transmits the communication or message to the third web-based application. The third web-based application (without being navigated to or launched) searches for the restaurants matching the one or more attributes and retrieves the available menu items (e.g., the data field). In one example, such as if the restaurant name was not received from the messaging client 104 in the message, the third web-based application identifies a plurality of restaurants that are within a threshold proximity (e.g., 1 kilometer) of the location associated with the image and/or the current location of the client device 102. The third web-based application then selects a given one of the restaurants that is closest to the client device 102 or the location associated with the image.

The third web-based application then retrieves the menu items available at the given one of the restaurants and the graphical elements representing each of the menu items. The third web-based application generates a message or communication with the requested data field (e.g., the menu items and/or the corresponding graphical elements representing each of the menu items). The third web-based application transmits the message or communication back to the messaging client 104. The messaging client 104 populates the data field of the third web-based application fragment to generate a visual identifier of the third web-based application fragment that includes the content obtained from the third web-based application based on the current context being displayed by the messaging client 104. Specifically, the messaging client 104 displays a menu overlay on top of the image displayed on the page that lists the menu items obtained from the third web-based application. The messaging client 104 can receive input from a user that selects a given one of the menu items on the list. In response, the messaging client 104 obtains the graphical element associated with the menu item (e.g., already received from the third web-based application or by exchanging additional messages with the third web-based application to receive the graphical element). The messaging client 104 displays the graphical element representing the selected menu item on the page. The messaging client 104 can receive input that scales and repositions the graphical element (representing the menu item) on the image. In this way, the messaging client 104 allows the user to add graphical elements (e.g., textual descriptions with unique designs associated with a given restaurant) that represent a real-world food item depicted in an image. The messaging client 104 can then receive input from the user selecting another tool to modify the image and/or to share the modified image (the image with the graphical element representing the food item) with one or more other users.

As another example, a fourth web-based application corresponding to garments (or fashion items, such as shirts, pants, hats, jewelry, and so forth) can be provided. The fourth web-based application can generate or provide a fourth web-based application fragment that includes a data field representing a list of garments available for purchase at a given store (or other suitable venue). The fourth web-based application can also provide graphical elements that represent each garment in the list of garments. The graphical representation can include stylized text, images and/or animations that represent and describe a given garment.

The fourth web-based application fragment can be an icon or marker or tool that is presented among a list of tools available for modifying a given image. The fourth web-based application fragment can include a data field that represents a list of garments received from the fourth web-based application. Specifically, a page of the messaging client 104 can be accessed in response to capturing an image with the client device 102 or in response to receiving the image from another client device 102. The page can present the image or video that was captured along with various tools for modifying the image. Such tools can include an option to sketch a drawing on the image, add text, add information identifying a location where the image or video was captured, add one or more augmented reality elements, change a background/foreground, and add a graphical element representing a garment corresponding to a real-world object (e.g., a garment) depicted by the image or video. In response to receiving a user selection of the add the graphical element representing a garment option, the messaging client 104 accesses the fourth web-based application fragment to retrieve and display garments available for purchase for the store represented by the image or video displayed on the page being viewed.

Specifically, the messaging client 104 can determine that the fourth web-based application fragment included in the template (corresponding to the page that includes the image or video) includes a data field (e.g., corresponding to garments and/or graphical elements representing each garment). The messaging client 104 can obtain instructions from the fourth web-based application fragment that identify the corresponding fourth web-based application and that specify one or more attributes of the page being viewed. The one or more attributes may be needed to populate the data field. Such attributes can include a location associated with the image displayed on the page and/or a current location of the client device 102. In one example, the messaging client 104 identifies a plurality of stores that are within a threshold proximity (e.g., 1 kilometer) of the location associated with the image and/or the current location of the client device 102. The messaging client 104 then selects a given one of the stores that is closest to the client device 102 or the location associated with the image to use and provide as the attributes of the page that are sent to the fourth web-based application. In one example, the messaging client 104 can receive input from a user that selects a particular store from a list of stores presented to the user as being within a threshold proximity to the client device 102.

The messaging client 104 generates a communication or message that includes the one or more attributes (e.g., the location associated with the image displayed on the page and/or a current location of the client device 102 and/or the store name) and that includes a request for available garments corresponding to the data field. The messaging client 104 transmits the communication or message to the fourth web-based application. The fourth web-based application (without being navigated to or launched) searches for the stores matching the one or more attributes and retrieves the available garments (e.g., the data field). In one example, such as if the store name was not received from the messaging client 104 in the message, the fourth web-based application identifies a plurality of stores that are within a threshold proximity (e.g., 1 kilometer) of the location associated with the image and/or the current location of the client device 102. The fourth web-based application then selects a given one of the stores that is closest to the client device 102 or the location associated with the image.

The fourth web-based application then retrieves the garments available at the given one of the stores and the graphical elements representing each of the garments (such graphical elements can also include augmented reality experiences, such as virtual try-on experiences). The fourth web-based application generates a message or communication with the requested data field (e.g., the garments and/or the corresponding graphical elements representing each of the garments). The fourth web-based application transmits the message or communication back to the messaging client 104. The messaging client 104 populates the data field of the fourth web-based application fragment to generate a visual identifier of the fourth web-based application fragment that includes the content obtained from the third web-based application based on the current context being displayed by the messaging client 104.

Specifically, the messaging client 104 displays a menu overlay on top of the image or video displayed on the page that lists the garments obtained from the fourth web-based application. The messaging client 104 can receive input from a user that selects a given one of the garments on the list. In response, the messaging client 104 obtains the graphical element associated with the garment (e.g., already received from the fourth web-based application or by exchanging additional messages with the fourth web-based application to receive the graphical element). The messaging client 104 displays the graphical element representing the selected garment on the page. In one example, the messaging client 104 determines that the selected one of the garments includes an associated augmented reality try-on experience. In such cases, the messaging client 104 retrieves the augmented reality experience and launches the experience to allow the user to interact with the graphical element. For example, the messaging client 104 can activate a camera of the client device 102, capture an image of the user and display a virtual reality element corresponding to the selected garment on top of the user. The messaging client 104 can receive input that scales and repositions the graphical element (representing the garment) on the image. In this way, the messaging client 104 allows the user to add graphical elements (e.g., textual descriptions with unique designs associated with a store) that represent a real-world garment depicted in an image. The messaging client 104 can then receive input from the user selecting another tool to modify the image and/or to share the modified image (the image with the graphical element representing the garment) with one or more other users.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104. In some cases, rather than launching the full-scale web-based resource, the messaging client 104 can use the application fragment associated with the full-scale web-based resource to access and obtain information corresponding to one or more features of the web-based resource. This information can then be represented in a page of information currently being viewed. In this way, contextually relevant information for a page being viewed can be accessed and obtained from specific features of the web-based resources without fully launching the web-based resources. Such contextually relevant information can then be represented in respective visual identifiers of fragments of the web-based resources.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on a current context of the external resource.

The messaging client 104 can present a list of the available external resources (e.g., third-party or external applications 109 or applets) to a user to launch or access a given external resource. This list can be presented in a context-sensitive menu. For example, the icons or markers representing different ones of the external application 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources and their associated fragments (e.g., web-based application fragments). Each external resource (apps) server 110 hosts, for example, a markup language (e.g., HTML5) based application or small-scale version of an external application (e.g., game, utility, payment, or ride-sharing application that is external to the messaging client 104). The external resource server 110 can also provide one or more web-based application fragments for each of the external applications. The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104 (e.g., whether the external resource is on a list of registered resources with the messaging client 104). In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A web-based application fragment system 224 presents a page of the messaging client 104 and one or more visual identifiers of web-based application fragments associated with the presented page. The web-based application fragment system 224 communicates with the external resource system 220 to populate data fields of the web-based application fragments associated with a page being presented. The web-based application fragment system 224 then adds the visual identifier representing the populated data field to the page being presented. An illustrative implementation of the web-based application fragment system 224 is shown and described in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
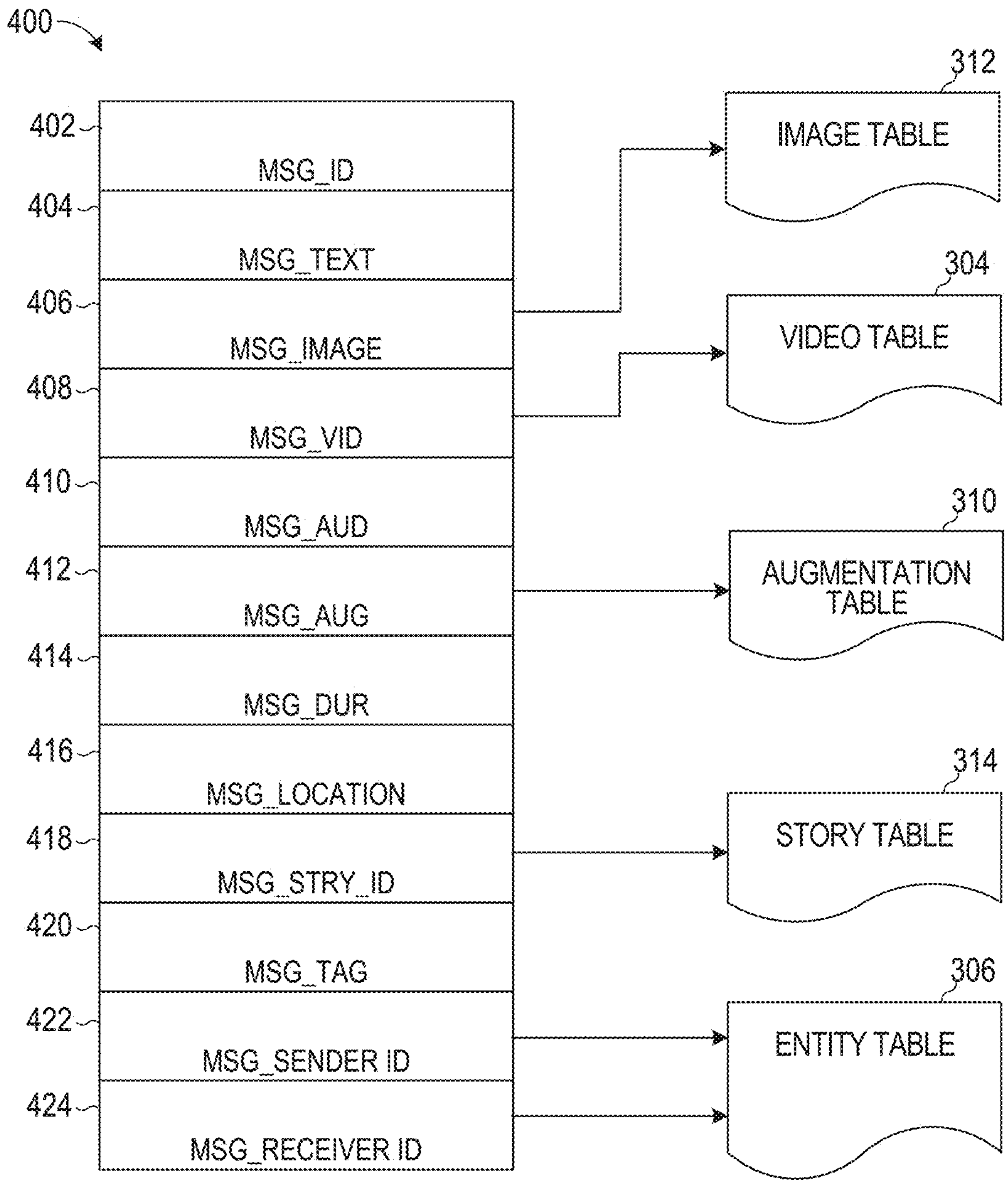
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Web-Based Application Fragment System

Figure 5:
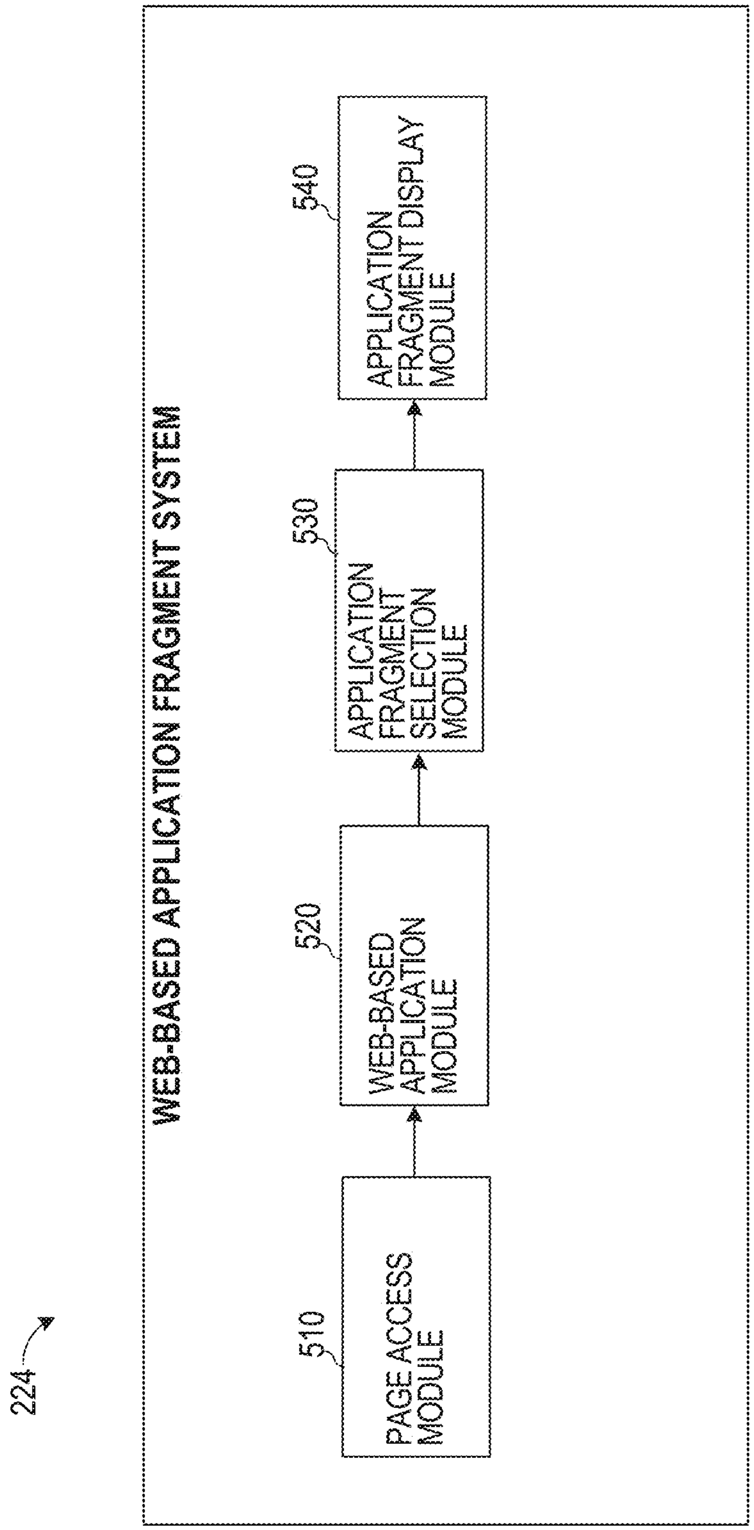
FIG. 5 is a block diagram showing an example web-based application fragment system, according to some examples.

FIG. 5 is a block diagram showing an example web-based application fragment system 224, according to some examples. Web-based application fragment system 224 includes a set of components that operate on a set of input data. The web-based application fragment system 224 includes a page access module 510, a web-based application module 520, an application fragment selection module 530, and an application fragment display module 540.

The page access module 510 can receive a user input that navigates to a given page of a messaging client 104. For example, a user input can be detected that selects an image modification option from a user interface. The image modification option can be displayed in response to capturing and displaying an image on the messaging client 104 and/or in response to receiving an image from another client device 102. In response, the page access module 510 launches an image modification feature of the messaging client 104 and presents a page that depicts an image or video (captured by the locally implemented messaging client 104 or received from an external source, such as another client device 102) along with a set of tools for modifying the image on the messaging client 104.

In one implementation, the page access module 510 obtains an image modification page template corresponding to the image modification feature. As another example, a user input can be detected that selects an identifier of a given venue, such as a restaurant, a stadium, theater, a concert hall, a university, point of interest (POI), or any other place of business. In response, the page access module 510 accesses a venue template associated with the given venue and generates for display a venue profile that includes various pieces of information about the venue (e.g., location, map, reviews, tickets, transportation, one or more media items, and so forth).

In some cases, the page access module 510 can determine that the template of the page currently being viewed includes an identifier of one or more web-based application fragments. In response, the page access module 510 identifies the web-based applications corresponding to the web-based application fragments and instructs the web-based application module 520 to obtain parameters for generating the one or more web-based application fragments. In some examples, a first web-based application can provide definitions of various types of web-based application fragments. Each type can include the same or different data fields and can have different visual features. For example, a first type of the web-based application fragment can be a circular icon or marker and a second type of the web-based application fragment can be a box. In one implementation, the first web-based application can select which type of web-based application fragment to provide to the page access module 510. In another implementation, the template of the page can specify a particular type of the web-based application fragment and the page access module 510 obtains the suitable type from the web-based application module 520.

In some examples, the web-based application module 520 provides the various web-based application fragments obtained from the web-based applications (associated with or identified by the page template of the page accessed by the page access module 510) to the application fragment selection module 530. The application fragment selection module 530 can select a subset of application fragments based on a registration status of the user associated with the messaging client 104. For example, the application fragment selection module 530 can obtain a list of previously approved and registered web-based applications. The application fragment selection module 530 can select only those web-based application fragments that correspond to the web-based applications that are on the previously approved list. The application fragment selection module 530 excludes any web-based application fragment from being selected if the corresponding web-based application has not been previously approved by the user (e.g., if the web-based application has not been previously connected to and authorized to share authentication information with the messaging client 104).

As another example, the application fragment selection module 530 can select a subset of application fragments based on a registration status of friends of the user associated with the messaging client 104. For example, the application fragment selection module 530 can obtain a list of previously approved and registered web-based applications of friends of the user. The application fragment selection module 530 can communicate with a server to identify a set of friends of the user and can request from the server a list of web-based applications that each of the friends has previously authorized or registered. The application fragment selection module 530 can select only those web-based application fragments that correspond to the web-based applications that have been previously registered by the friends of the user, even including web-based applications which have not been registered by the user. The application fragment selection module 530 excludes any web-based application fragment from being selected if the corresponding web-based application has not been previously approved by the user and has not been previously approved or registered by at least one of the friends of the user (e.g., if the web-based application has not been previously connected to and authorized to share authentication information with the messaging client 104).

The application fragment selection module 530 can then process each obtained application fragment that is selected to identify data fields of each application fragment. For example, the application fragment selection module 530 can identify a first application fragment that corresponds to a first web-based application (e.g., a menu items application or garments application). The application fragment selection module 530 can determine that the first web-based application fragment includes a data field (e.g., corresponding to menu items or garments). The application fragment selection module 530 can obtain instructions from the first application fragment that identify the corresponding first web-based application and that specify one or more attributes of the page being viewed. The one or more attributes may be needed to populate the data field. In one example, the one or more attributes can include a location associated with an image displayed on the page, a current location of the client device 102, a restaurant, store, or venue name and location. The application fragment selection module 530 can access metadata associated with the page being viewed to obtain the location and any other information corresponding to the one or more attributes. The application fragment selection module 530 can also request input from the user that specifies the current location and/or the restaurant, store, or venue name and location.

In an example, the application fragment selection module 530 generates a communication or message that includes the one or more attributes (e.g., the name of the restaurant, store, or venue name and location, and/or one or more features of a real-world object or real-world objects depicted in the image displayed on the page) and that includes a request for menu items or garments corresponding to the data field. The application fragment selection module 530 transmits the communication or message to the first web-based application. The first web-based application (without being navigated to or launched) searches for the restaurant, store, or venue name and location matching the one or more attributes and retrieves the available menu items or garments (e.g., the data field). In an implementation, the first web-based application can filter or reduce the menu items or garments that are retrieved based on matching one or more features associated with the menu items or garments with one or more features of the real-world object(s) depicted in the image displayed on the page. In this way, if the image includes a depiction of a hamburger (e.g., includes features that are associated with a hamburger real-world object), the first web-based application can exclude from the list of menu items those menu items that do not have attributes or features corresponding to a hamburger real-world object (e.g., salads, cakes and so forth). The first web-based application can select menu items that have similar attributes or features as the features of the real-world object, such as menu items corresponding to hot dogs, hamburgers and so forth. The first web-based application generates a message or communication with the requested data field (e.g., the menu items or garments and associated graphical elements representing the menu items or garments). In some cases, the first web-based application includes a list of attributes or features of each menu item or garment provided in the message or communication. The first web-based application transmits the message or communication back to the application fragment selection module 530.

The application fragment selection module 530 populates the data field of the first web-based application fragment. In an example, the application fragment selection module 530 provides the information corresponding to the first web-based application fragment to the application fragment display module 540. In one example, the application fragment selection module 530 locally compares the features or attributes of the real-world object depicted in the image on the page with the features or attributes of the menu items or garments received from the first web-based application. The application fragment selection module 530 can select a subset of the menu items or garments based on those menu items or garments that are associated with features or attributes that match within a certain level or threshold the features or attributes of the real-world object depicted in the image displayed on the page.

The application fragment display module 540 generates a visual identifier of the first web-based application fragment (based on the specified type of the visual identifier of the web-based application fragment). The application fragment display module 540 includes, in the visual identifier, the content obtained from the first web-based application based on the current context being displayed by the messaging client 104. The application fragment display module 540 can then render a display of the visual identifier within the page of the messaging client 104 being viewed at a position and placement specified by the template corresponding to the page.

For example, the application fragment display module 540 can display a menu on top of an image that depicts a real-world object. The menu can include the information of the populated data field, such as the menu items or garments available for purchase at the restaurant, store, or venue (or the subset of menu items or garments that are associated with features or attributes matching the features or attributes of the real-world object depicted in the image). The application fragment display module 540 can detect input that selects a given one of the menu items or garments. In response, the application fragment display module 540 can retrieve the corresponding graphical element that describes or visually represents the selected menu item or garment. The application fragment display module 540 displays the graphical element in place of the menu that displays the menu items or garments and receives input that scales and re-positions the displayed graphical element within the image that depicts the real-world object (e.g., the food item or garment). The application fragment display module 540 can then allow the user to select another tool for modifying the image that now includes the graphical element in an additional manner, such as by adding a sketch or drawing or inserting text.

The application fragment display module 540 can detect input that selects a given one of the visual identifiers. In response, the application fragment display module 540 communicates with the web-based application module 520 to launch the corresponding web-based application in a new page.

Figure 6:
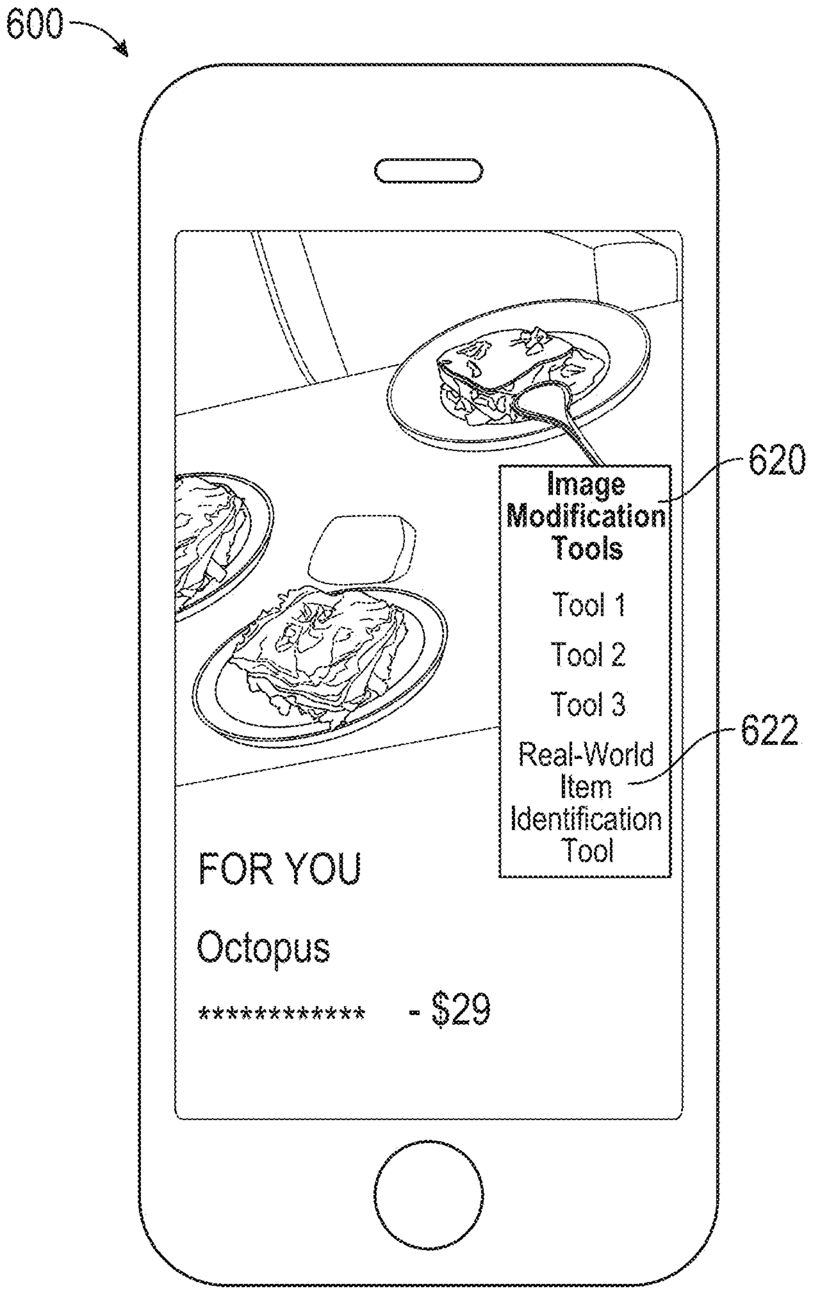
FIGS. 6, 7, and 8 are diagrammatic representations of outputs of the web-based application fragment system, in accordance with some examples.
Figure 7:
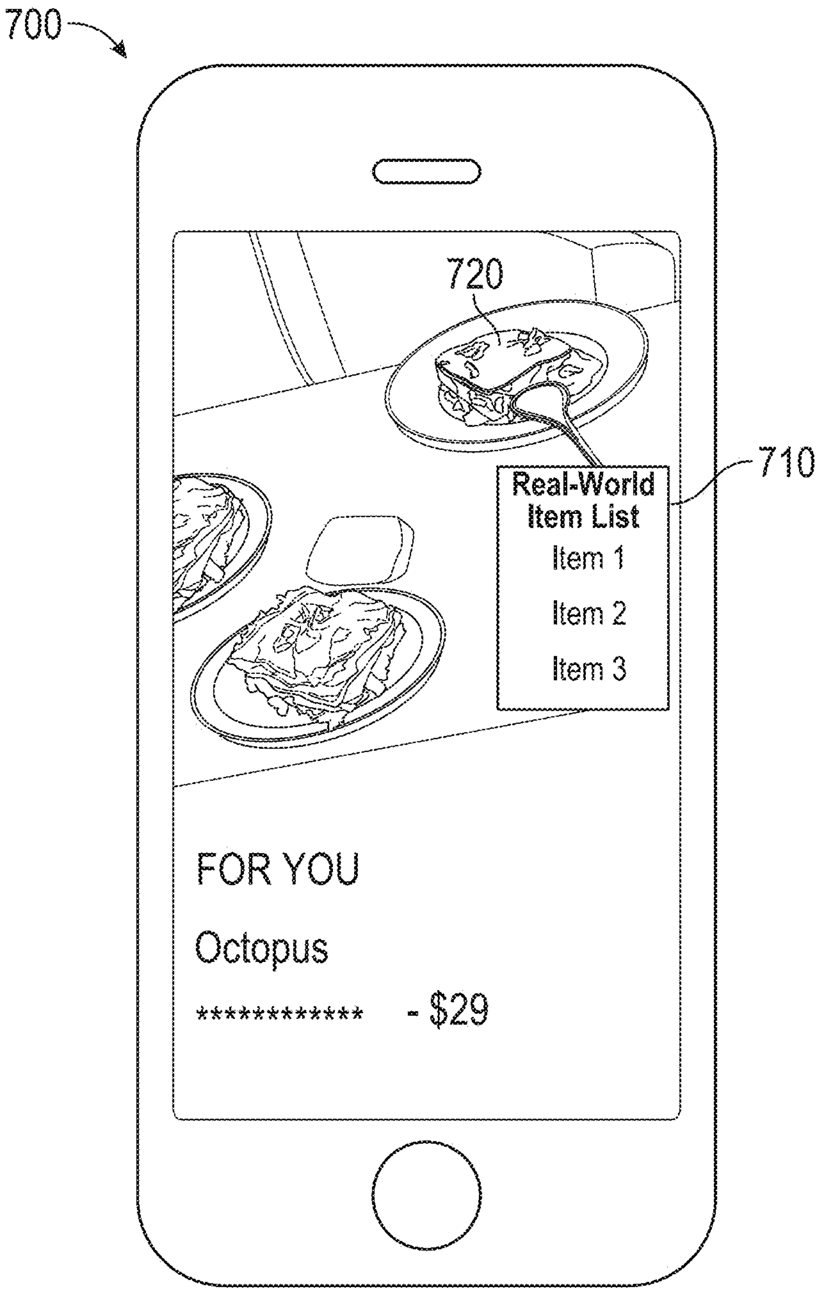
Figure 8:
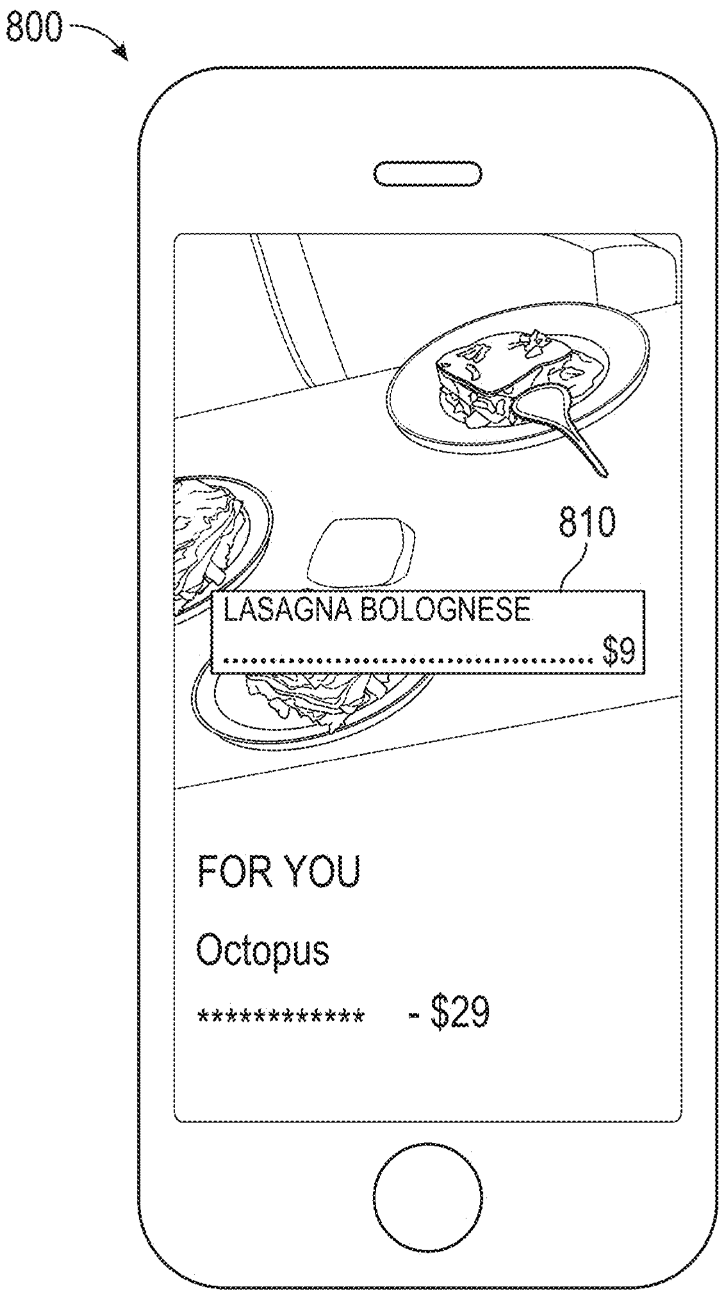

FIGS. 6, 7, and 8 are diagrammatic representations of outputs of the web-based application fragment system 224, in accordance with some examples. Specifically, as shown in FIG. 6, the messaging client 104 receives a user request to navigate to an image modification page 600. In response, the messaging client 104 presents the image modification page 600. The image modification page 600 includes an image or video which has been captured by the client device 102 or received from another user. The image modification page 600 can be associated with one or more web-based application fragments. In an example, the image modification page 600 can include an identifier of a given web-based application fragment including an indication of a visual indicator or identifier type.

The image modification page 600 can present a list of image modification tools 620. The tools 620 can include a tool or option to add graphics, a tool or option to add text, a tool or item to add augmented reality elements, a tool or option to sketch a drawings, and/or a real-world item identification tool or option 622. The real-world item identification tool or option 622 allows a user to add a graphical element representing a given real-world object depicted in the image displayed on the image modification page 600 in response to selection of the real-world item identification tool or option 622.

In an example, in response to receiving a selection of the real-world item identification tool or option 622, the messaging client 104 can retrieve the identifier of a given web-based application fragment associated with the real-world item identification tool or option 622. The given web-based application fragment can be a fragment that lists menu items or garments available for purchase at a venue corresponding to a current location or a location corresponding to the image displayed on the image modification page 600. The messaging client 104 accesses the web-based application associated with the web-based application fragment. The messaging client 104 retrieves the web-based application fragment from the corresponding web-based application. The messaging client 104 processes the web-based application fragment to determine that the web-based application fragment includes a given data field. The messaging client 104 can determine that the given data field is associated with or needs one or more attributes or parameters of the image modification page 600 in order to populate the given data field. For example, the messaging client 104 can determine that the given data field is associated with a GPS coordinates attribute. In response, the messaging client 104 sends a message to the web-based application. The message can identify the given data field (e.g., a menu items or garments) and the GPS coordinates attribute along with a request for the information or content corresponding to the given data field. The web-based application can search for one or more menu items or garments corresponding to a restaurant, venue, or store within a threshold proximity to the GPS coordinates attribute and provide a message back to the messaging client 104 with the one or more menu items or garments.

As shown in FIG. 7, the messaging client 104 can populate the given data field with the one or more menu items or garments and generate a visual indicator, such as a menu 710, of the given web-based application fragment. Namely, the messaging client 104, in response to receiving input that selects the real-world item identification tool or option 622, presents a page 700 that includes the image or video that depicts a real-world object 720. The page 700 also includes a menu 710 generated by the web-based application fragment. The menu 710 includes data fields that have been populated based on content received from the web-based application corresponding to the web-based application fragment, such as a list of menu items available for purchase at a restaurant corresponding to a location of the image or a list of garments available for purchase at a store corresponding to the location of the image.

The messaging client 104 can receive input from the user selecting one or more of the menu items or garments displayed in the menu. In response, the messaging client 104 displays a page 800 (FIG. 8) that includes one or more graphical representations 810 corresponding to the one or more menu items or garments selected from the menu. The messaging client 104 can receive input that moves, scales, and repositions the one or more graphical representations 810 within the displayed image. In an example, the messaging client 104 can receive input that positions the one or more graphical representations 810 next to a corresponding real-world object depicted in the image (e.g., a real-world food item or garment). In this way, a user can add artistic descriptions (e.g., using the graphical elements) provided by a venue (e.g., through a web-based application) at which an image was captured that graphically describe a real-world object depicted in the image captured at the venue. In another example, the messaging client 104 can launch an augmented reality experience (e.g., a virtual try-on experience) corresponding to a garment selected from the menu. In such cases, the messaging client 104 can activate a rear-facing or front-facing camera and capture a real-time video of the user. The messaging client 104 can present that real-time video on top of the image shown in page 800 and render a virtual element corresponding to the selected garment on top of the user depicted in the video. In such cases, a user can capture an image of an article of clothing at a store and be presented with a list of garments corresponding to the article of clothing depicted in the image through a garment-based application fragment. The user can select a garment from the list of garments to activate a virtual try-on experience so the user can see how the garment depicted in the image looks on the user in real-time. The depiction of the user wearing the virtual garment in a video can be presented together with the image that depicts the real-world garment captured at the store.

Figure 9:
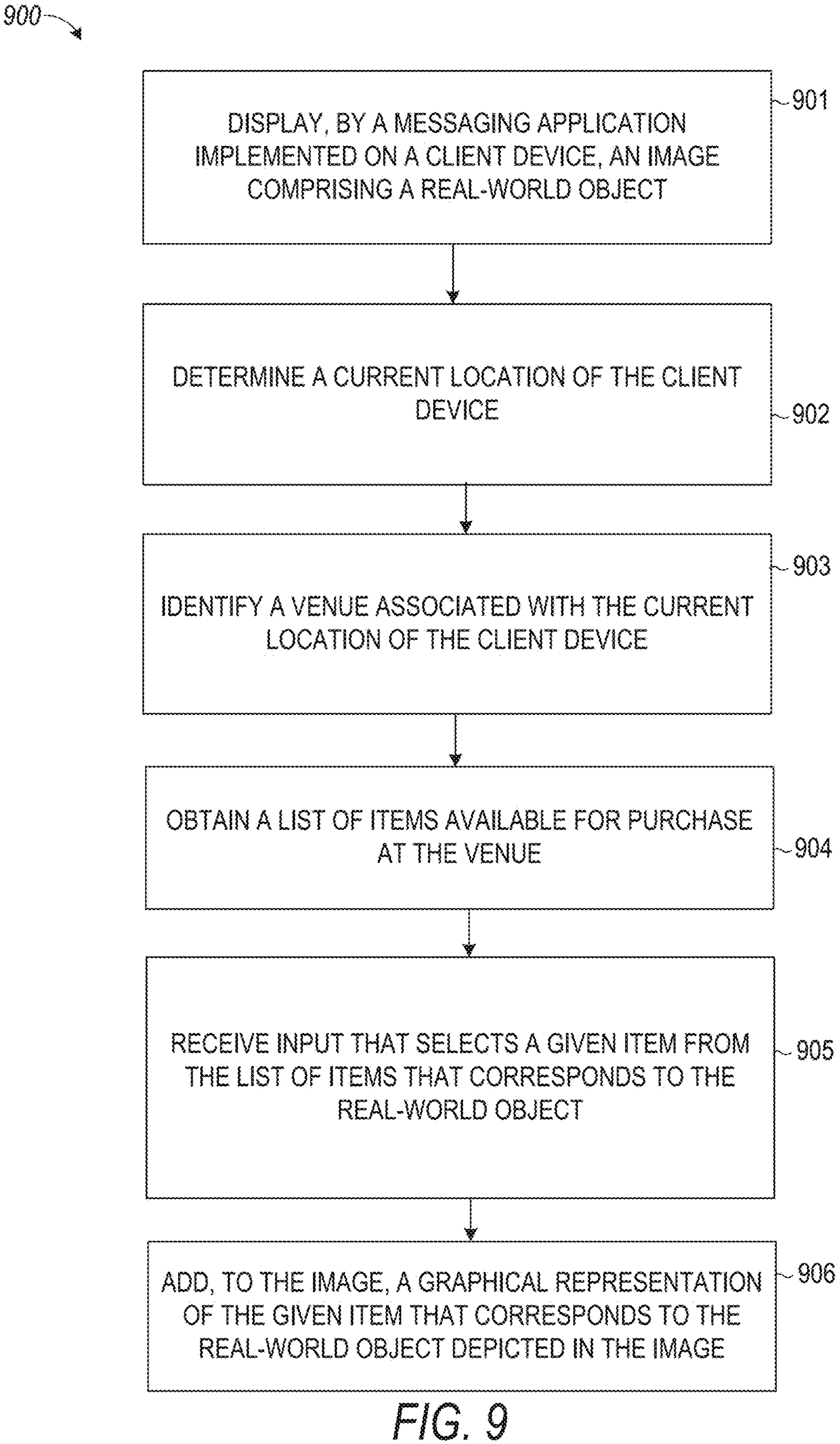
FIG. 9 is a flowchart illustrating example operations of the web-based application fragment system, in accordance with some examples.

FIG. 9 is a flowchart of a process 900 performed by the web-based application fragment system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the web-based application fragment system 224 (e.g., a client device 102 or a server) displays, by a messaging application implemented on a client device, an image comprising a real-world object, as discussed above. For example, the page access module 510 receives input from a user that navigates to an image modification page provided by the messaging client 104. The image modification page allows the user to capture a new image or video, modify an existing image or video, or access an image or video received from another user. The image modification page displays the image or video along with a menu of tools available for modifying the image or video.

At operation 902, the web-based application fragment system 224 determines a current location of the client device, as discussed above. For example, the page access module 510 accesses a template of the page being displayed and obtains a location associated with metadata of the image or video displayed and/or a current location of the client device 102 and/or a location specified by the user.

At operation 903, the web-based application fragment system 224 identifies a venue associated with the current location of the client device, as discussed above. For example, the page access module 510 searches for nearby restaurants, stores, or venues that are within a threshold proximity of the determined location.

At operation 904, the web-based application fragment system 224 obtains a list of items available for purchase at the venue, as discussed above. For example, the page access module 510 can determine that an application fragment includes a data field that represents menu items or garments. The application fragment can also specify one or more parameters or attributes of the page being viewed that are needed to populate the data field. The page access module 510 communicates with a corresponding web-based application using the data field and the parameters or attributes of the page to obtain the menu items or garments available for purchase from the venue associated with the determined location.

At operation 905, the web-based application fragment system 224 receives input that selects a given item from the list of items that corresponds to the real-world object, as discussed above. For example, the application fragment display module 540 displays a menu as an overlay on top of the image or video that is displayed that includes a list of menu items or garments. The application fragment display module 540 receives input that selects a given menu item or garment from the displayed menu.

At operation 906, the web-based application fragment system 224 adds, to the image, a graphical representation of the given item that corresponds to the real-world object depicted in the image, as discussed above. For example, the application fragment display module 540 renders a display that includes a graphical representation of the menu item or garment that is selected from the displayed menu. The graphical representation can be moved and scaled by the user and positioned relative to the real-world object depicted in the image or video.

Machine Architecture

Figure 10:
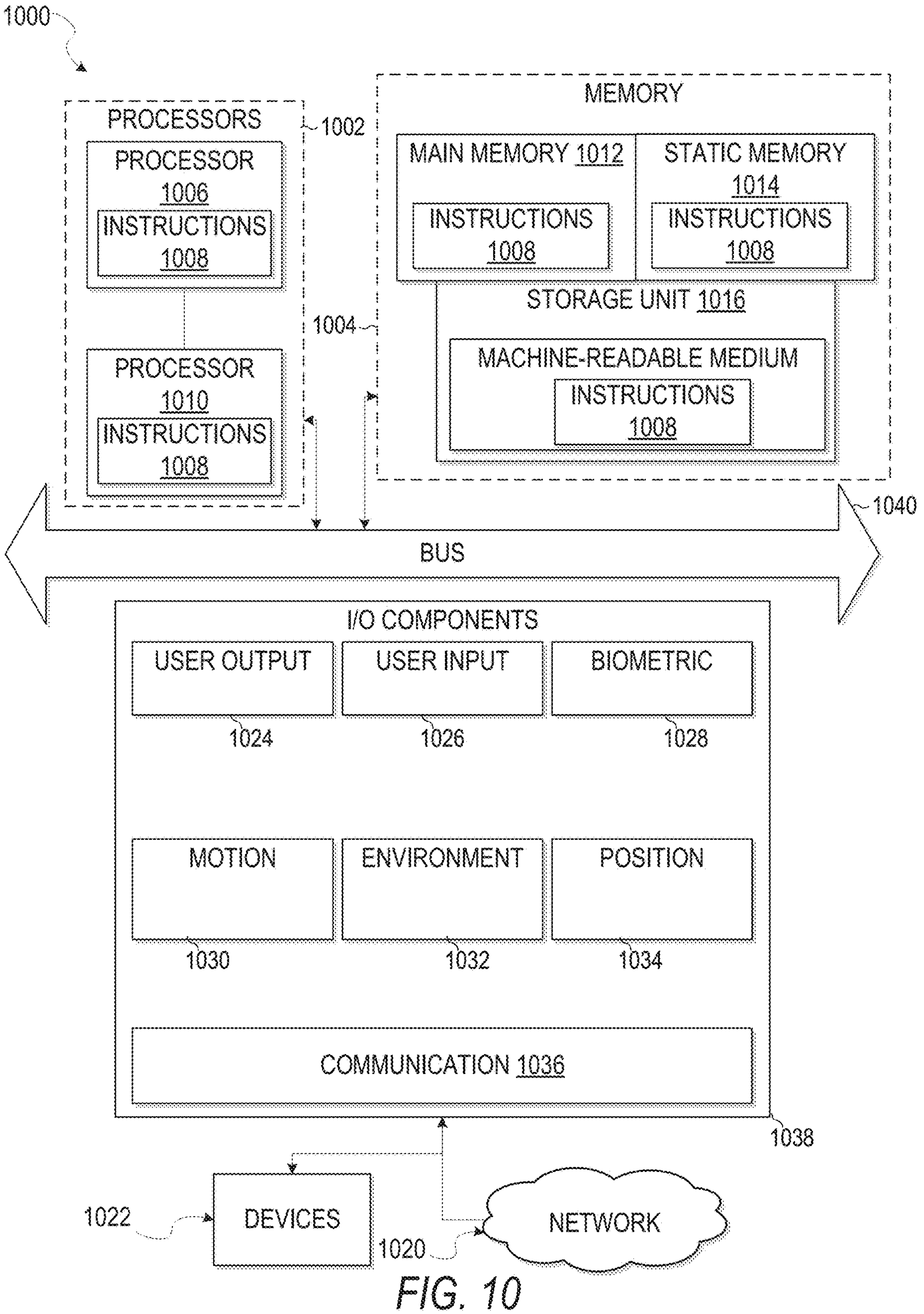
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
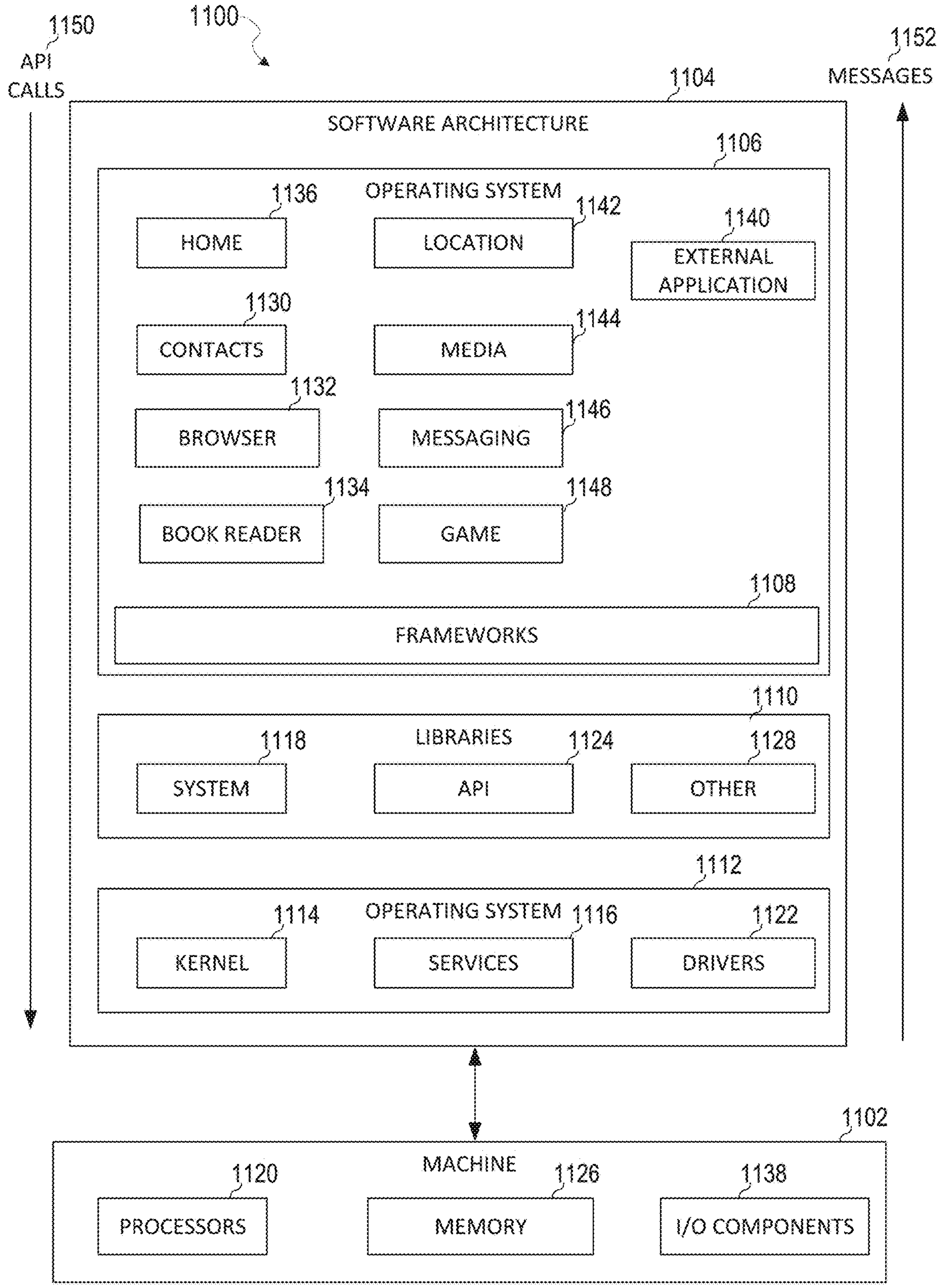
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

identifying a plurality of web-based application fragments associated with a web-based application;

accessing a list of previously approved web-based application fragments;

determining which of the plurality of web-based application fragments correspond to the list of previously approved web-based application fragments;

selecting only a subset of the plurality of web-based application fragments that corresponds to the list of previously approved web-based application fragments, a given web-based application fragment being excluded from being selected in response to determining that the given web-based application fragment is not authorized to share information with an application on a device, the subset of the plurality of web-based application fragments being used to add a graphical representation comprising an animation that visually represents a selected item;

displaying an image depicting a real-world object;

in response to receiving user input comprising a request to add the graphical representation to the image, overlaying, on the image, the graphical representation comprising the animation that visually represents the selected item comprising the real-world object depicted in the image, the graphical representation comprising a unique design associated with a venue corresponding to the real-world object; and enabling a user to reposition the graphical representation on the image.

2. The method of claim 1, further comprising:

determining a current location of the device; and communicating the current location of the device to a web-based application, the web-based application, in response to determining that a venue name was not received from the application in the communication, identifying a plurality of venues that are within a threshold proximity of the current location and selecting a given venue from the plurality of venues.

3. The method of claim 2, further comprising:

determining a list of items, available for purchase at the given venue, corresponding to the real-world object;

receiving input that selects an item from the list of items; and obtaining the animation that visually represents the selected item available for purchase at the given venue and that corresponds to the real-world object.

4. The method of claim 3, wherein the graphical representation identifies the real-world object and includes stylized text in addition to the animation.

5. The method of claim 1, further comprising:

receiving a request to augment an image;

displaying a page of the application comprising a plurality of options for augmenting the image;

identifying a particular web-based application that is linked to the page of the application, the particular web-based application being configured to provide a list of restaurant menu items;

obtaining a particular application fragment corresponding to the particular web-based application that is linked to the page of the application;

identifying a data field of the particular application fragment that corresponds to information being presented on the page of the application, the data field comprising the list of items available for purchase; and populating the data field of the application fragment by sending a message from the application to the particular web-based application, the message comprising a request for content corresponding to the information presented on the page of the application.

6. The method of claim 5, wherein the data field further comprises graphical representations of each of the list of items.

7. The method of claim 1, further comprising:
determining that a template of a graphical user interface being viewed by the device to display an image includes an identifier of one or more web-based application fragments;
in response to determining that the template of the graphical user interface includes the identifier of the one or more web-based application fragments, identifying one or more web-based applications corresponding to the one or more web-based application fragments;
causing a first web-based application of the one or more web-based applications to provide definitions of various types of web-based application fragments, each type including different visual features with different data fields, a first of the various types of web-based application fragments comprising a first type of icon and a second of the various types of web-based application fragments comprising a second type of icon; and
causing the first web-based application to select one of the various types of web-based application fragments based on the template of the graphical user interface being viewed by the device, the selected one of the various types of web-based application fragments generating the animation that visually represents the selected item.

8. The method of claim 1, further comprising:
searching for a list of stores within a threshold proximity to a current location of the device; and
selecting a given store from the list of stores based on a proximity of the given store to the current location.

9. The method of claim 1, further comprising receiving an image from another client device, wherein the image is displayed in response to being received from the another client device.

10. The method of claim 1, further comprising:
sending an image with the graphical representation of the item to another client device.

11. The method of claim 1, wherein the graphical representation comprises a sticker, the sticker comprising a textual description of a real-world object.

12. The method of claim 1, further comprising displaying a list of tools for modifying an image that includes the graphical representation.

13. The method of claim 1, further comprising adding a name of a venue to an image that includes the graphical representation in addition to a current time.

14. The method of claim 1, further comprising:
performing image recognition on the image to obtain one or more features associated with a real-world object.

15. The method of claim 14, further comprising:
comparing the one or more features associated with the real-world object to features associated with each of the items on the list of items;
based on the comparing, identifying a subset of the list of items having corresponding sets of the features that match the one or more features of the real-world object within a threshold; and
causing the subset of the list of items to be displayed.

16. The method of claim 1, further comprising:
capturing the image by a camera of the device, wherein the image is displayed in response to being captured.

17. A system comprising:
at least one processor of a device; and
a memory component having instructions stored thereon that, when executed by the at least one processor, cause the at least one processor to perform operations comprising:
identifying a plurality of web-based application fragments associated with a web-based application;
accessing a list of previously approved web-based application fragments;
determining which of the plurality of web-based application fragments correspond to the list of previously approved web-based application fragments;
selecting only a subset of the plurality of web-based application fragments that corresponds to the list of previously approved web-based application fragments, a given web-based application fragment being excluded from being selected in response to determining that the given web-based application fragment is not authorized to share information with an application on a device, the subset of the plurality of web-based application fragments being used to add a graphical representation comprising an animation that visually represents a selected item;
displaying an image depicting a real-world object;
in response to receiving user input comprising a request to add the graphical representation to the image, overlaying, on the image, the graphical representation comprising the animation that visually represents the selected item comprising the real-world object depicted in the image, the graphical representation comprising a unique design associated with a venue corresponding to the real-world object; and
enabling a user to reposition the graphical representation on the image.

18. The system of claim 17, wherein the graphical representation identifies the real-world object.

19. The system of claim 17, the operations comprising:
capturing the image by a camera of the device, wherein the image is displayed in response to being captured.

20. A non-transitory computer-readable storage medium having stored thereon instructions that, when executed by at least one processor of a device, cause the at least one processor to perform operations comprising:
identifying a plurality of web-based application fragments associated with a web-based application;
accessing a list of previously approved web-based application fragments;
determining which of the plurality of web-based application fragments correspond to the list of previously approved web-based application fragments;
selecting only a subset of the plurality of web-based application fragments that corresponds to the list of previously approved web-based application fragments, a given web-based application fragment being excluded from being selected in response to determining that the given web-based application fragment is not authorized to share information with an application on a device, the subset of the plurality of web-based application fragments being used to add a graphical representation comprising an animation that visually represents a selected item;
displaying an image depicting a real-world object;
in response to receiving user input comprising a request to add the graphical representation to the image, overlaying, on the image, the graphical representation comprising the animation that visually represents the selected item comprising the real-world object depicted in the image, the graphical representation comprising a unique design associated with a venue corresponding to the real-world object; and enabling a user to reposition the graphical representation on the image.

* * * * *